(12) United States Patent
Konda et al.

(10) Patent No.: US 10,845,863 B2
(45) Date of Patent: Nov. 24, 2020

(54) ELECTRONIC DEVICE, DRIVING METHOD, AND SLAVE ELEMENT TO OBTAIN SUFFICIENT TRANSMISSION CHARACTERISTICS WITH LOW POWER CONSUMPTION

(71) Applicant: SONY CORPORATION, Tokyo (JP)

(72) Inventors: Kenji Konda, Kanagawa (JP); Kenichi Maruko, Kanagawa (JP); Hideyuki Suzuki, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 100 days.

(21) Appl. No.: 16/086,487

(22) PCT Filed: Mar. 15, 2017

(86) PCT No.: PCT/JP2017/010303
§ 371 (c)(1),
(2) Date: Sep. 19, 2018

(87) PCT Pub. No.: WO2017/169756
PCT Pub. Date: Oct. 5, 2017

(65) Prior Publication Data
US 2019/0086989 A1    Mar. 21, 2019

(30) Foreign Application Priority Data

Mar. 29, 2016   (JP) .................................. 2016-066243

(51) Int. Cl.
*G06F 1/3234* (2019.01)
*G06F 1/26* (2006.01)
(Continued)

(52) U.S. Cl.
CPC .......... *G06F 1/3234* (2013.01); *G06F 1/1686* (2013.01); *G06F 1/189* (2013.01);
(Continued)

(58) Field of Classification Search
CPC ...... G06F 1/3234; G06F 1/1686; G06F 1/189; G06F 1/266; G06F 9/3877; G06F 13/4247
See application file for complete search history.

(56) References Cited

U.S. PATENT DOCUMENTS

| 4,914,625 A | 4/1990 | Billian |
| 5,450,393 A | 9/1995 | Watanabe et al. |

(Continued)

FOREIGN PATENT DOCUMENTS

| EP | 271626 A1 | 6/1988 |
| EP | 618702 A1 | 10/1994 |

(Continued)

OTHER PUBLICATIONS

International Search Report and Written Opinion of PCT Application No. PCT/JP2017/010303, dated Jun. 13, 2017, 06 pages.

*Primary Examiner* — Glenn A. Auve
(74) *Attorney, Agent, or Firm* — Chip Law Group

(57) ABSTRACT

The electronic device includes a master element and a plurality of slave elements that are daisy-chain-connected. The slave element includes an input terminal connected to a slave element adjacently provided on the opposite side of the master element, an output terminal connected to the slave element adjacently provided on the side of the master element or the master element, and a first switch that is provided in a section between the input terminal and the output terminal used as a transmission path of transmission data and is connected to the transmission path in series. The master element receives the transmission data transmitted from the slave element to be the transmission source via the transmission path, and at least the slave element to be the transmission source includes a data transmission unit that is connected to the transmission path via a second switch and transmits the transmission data.

16 Claims, 12 Drawing Sheets

(51) Int. Cl.
*G06F 1/18* (2006.01)
*G06F 1/16* (2006.01)
*G06F 9/38* (2018.01)
*G06F 13/42* (2006.01)

(52) U.S. Cl.
CPC ............ *G06F 1/266* (2013.01); *G06F 9/3877* (2013.01); *G06F 13/4247* (2013.01)

(56) References Cited

U.S. PATENT DOCUMENTS

| | | | | |
|---|---|---|---|---|
| 2007/0204082 A1* | 8/2007 | Shimizu | ............ | H04L 12/40169 710/110 |
| 2009/0021955 A1* | 1/2009 | Kuang | ................... | H05B 45/48 362/479 |
| 2010/0185841 A1* | 7/2010 | Monreal | ................. | G06F 13/37 713/2 |
| 2011/0185093 A1* | 7/2011 | Matsuo | ................. | H04L 12/403 710/110 |
| 2013/0282941 A1* | 10/2013 | van Dijk | ............... | H04L 12/403 710/110 |
| 2014/0254431 A1* | 9/2014 | Yan | ........................ | H04Q 11/04 370/255 |
| 2015/0372524 A1* | 12/2015 | Park | .......................... | G06F 1/26 320/112 |
| 2017/0083468 A1* | 3/2017 | Sengoku | ................ | G06F 13/404 |
| 2017/0134184 A1* | 5/2017 | Hollander | ............. | H04L 7/0041 |

FOREIGN PATENT DOCUMENTS

| | | |
|---|---|---|
| JP | 63-164649 A | 7/1988 |
| JP | 06-224928 A | 8/1994 |
| JP | 2015-088919 A | 5/2015 |
| WO | 94/07317 A1 | 3/1994 |

* cited by examiner

ELECTRONIC DEVICE, DRIVING METHOD, AND SLAVE ELEMENT TO OBTAIN SUFFICIENT TRANSMISSION CHARACTERISTICS WITH LOW POWER CONSUMPTION

CROSS REFERENCE TO RELATED APPLICATIONS

This application is a U.S. National Phase of International Patent Application No. PCT/JP2017/010303 filed on Mar. 15, 2017, which claims priority benefit of Japanese Patent Application No. JP 2016-066243 filed in the Japan Patent Office on Mar. 29, 2016. Each of the above-referenced applications is hereby incorporated herein by reference in its entirety.

TECHNICAL FIELD

The present technology relates to an electronic device, a driving method, and a slave element, and more particularly, to an electronic device, a driving method, and a slave element capable of obtaining sufficient transmission characteristics with low power consumption.

BACKGROUND ART

Conventionally, a circuit has been known in which a plurality of elements mounted on a substrate is connected with a bus and data is transmitted and received between the elements.

As such a circuit, for example, a technology has been proposed in which a plurality of communication devices is daisy-chain-connected with a plurality of twisted pair lines and arbitrary two communication devices from among the plurality of communication devices communicate with each other (for example, refer to Patent Document 1). With this technology, the communication devices mutually exchange data so as to perform a cooperative operation, and more appropriate control can be performed.

CITATION LIST

Patent Document

Patent Document 1: Japanese Patent Application Laid-Open No. 2015-88919

SUMMARY OF THE INVENTION

Problems to be Solved by the Invention

However, according to the technology described above, in a case where the elements connected with the bus transmit data to each other, it has been difficult to obtain sufficient transmission characteristics with low power consumption.

For example, in a case where the plurality of communication devices is daisy-chain-connected and the communication devices transmit data to each other, reflection occurs at both ends of a transmission path through which the data is transmitted. Therefore, to prevent the reflection and reduce noise, it is necessary to provide termination resistors at both ends of the transmission path.

However, if the data is transmitted as providing the termination resistors at both ends of the transmission path, the communication device for transmitting the data needs to output, by a driver, a current twice greater than a case where a communication device for transmitting the data and a communication device for receiving the data are connected one by one. Then, the power consumption of the entire circuit increases.

The present technology has been made in consideration of such a situation, and an object of the present technology is to obtain sufficient transmission characteristics with low power consumption.

Solutions to Problems

An electronic device according to a first aspect of the present technology includes a master element and a plurality of slave elements that are daisy-chain-connected, in which the slave element includes an input terminal that is connected to the slave element adjacently provided on the opposite side of the master element, an output terminal that is connected to the slave element adjacently provided on the side of the master element or the master element, and a first switch that is provided between the input terminal and the output terminal used as a transmission path of transmission data and is connected to the transmission path in series, the master element receives the transmission data transmitted from the slave element to be a transmission source via the transmission path, and at least the slave element to be the transmission source includes a data transmission unit that is connected to the transmission path via a second switch and transmits the transmission data.

The slave element can be an image sensor.

It is possible to make the slave element to be the transmission source transmit image data as the transmission data.

It is possible that the first switch is released and the second switch is connected in the slave element to be the transmission source and the first switch is connected in the slave element connected between the slave element to be the transmission source and the master element.

It is possible that, in all the slave elements different from the slave element to be the transmission source, the first switches are connected.

Each of the plurality of slave elements can include the data transmission unit and the second switch.

It is possible that, in all the slave elements different from the slave element to be the transmission source, the second switch is released.

A first state signal transmitting unit that is connected to the input terminal via a third switch and transmits a state signal indicating a transmission state of the transmission data and a second state signal transmitting unit that is connected to the output terminal via a fourth switch and transmits the state signal can be further provided in the slave element to be the transmission source, and a first state signal receiving unit that is connected to the input terminal and receives the state signal transmitted from the second state signal transmitting unit and a second state signal receiving unit that is connected to the output terminal and receives the state signal transmitted from the first state signal transmitting unit can be further provided in each of the plurality of slave elements.

It is possible that, in the slave element to be the transmission source, each of the third switch and the fourth switch is connected.

Each of the plurality of slave elements can include the third switch, the first state signal transmitting unit, the fourth switch, and the second state signal transmitting unit, and, in the slave element connected between the slave element to be the transmission source and the master element, the third switch and the fourth switch can be released.

In the slave element connected to the slave element to be the transmission source and provided on the opposite side of the master element, the first switch and the second switch can be released.

In the slave element connected to the slave element to be the transmission source and provided on the opposite side of the master element, the third switch can be connected, and the fourth switch can be released.

In the slave element connected to the slave element to be the transmission source and provided on the opposite side of the master element, it is possible to make the first state signal transmitting unit transmit the state signal.

It is possible that the master element and the plurality of slave elements are mounted on a substrate and the input terminal and the output terminal are pads for connecting the substrate and the slave elements.

A driving method of an electronic device according to the first aspect of the present technology in which the slave element includes an input terminal that is connected to the slave element adjacently provided on the opposite side of the master element, an output terminal that is connected to the slave element adjacently provided on the side of the master element or the master element, and a first switch that is provided between the input terminal and the output terminal used as a transmission path of transmission data and is connected to the transmission path in series, and at least the slave element to be the transmission source includes a data transmission unit that is connected to the transmission path via a second switch and transmits the transmission data, and the driving method including steps of: releasing the first switch and connecting the second switch in the slave element to be the transmission source; connecting the first switch in the slave element connected between the slave element to be the transmission source and the master element; transmitting the transmission data by the data transmission unit of the slave element to be the transmission source; and receiving the transmission data transmitted from the data transmission unit of the slave element to be the transmission source via the transmission path by the master element.

In the first aspect of the present technology, in the electronic device including the master element and the plurality of slave elements that are daisy-chain-connected, in the slave element, the input terminal connected to the slave element adjacently provided on the opposite side of the master element, the output terminal connected to the slave element adjacent to the side of the master element or the master element, and the first switch that is provided in a section between the input terminal and the output terminal used as a transmission path of the transmission data and is connected to the transmission path in series are provided. Furthermore, the master element receives the transmission data transmitted from the slave element to be the transmission source via the transmission path, and at least the slave element to be the transmission source includes a data transmission unit that is connected to the transmission path via a second switch and transmits the transmission data.

A slave element according to a second aspect of the present technology is a slave element that is daisy-chain-connected to a master element and one or a plurality of other slave elements, includes an input terminal that is connected to the slave element adjacently provided on the opposite side of the master element, an output terminal that is connected to the other slave element adjacent to the side of the master element or the master element, a first switch that is provided in a section between the input terminal to the output terminal used as a transmission path of transmission data and is connected to the transmission path in series, and a data transmission unit that is connected to the transmission path via a second switch and transmits the transmission data to the master element.

In the second aspect of the present technology, in the slave element that is daisy-chain-connected to a master element and one or a plurality of other slave elements, an input terminal that is connected to the slave element adjacently provided on the opposite side of the master element, an output terminal that is connected to the other slave element adjacent to the side of the master element or the master element, a first switch that is provided in a section between the input terminal to the output terminal used as a transmission path of transmission data and is connected to the transmission path in series, and a data transmission unit that is connected to the transmission path via a second switch and transmits the transmission data to the master element are provided.

Effects of the Invention

According to the first aspect and the second aspect of the present technology, sufficient transmission characteristics can be obtained with low power consumption.

MODE FOR CARRYING OUT THE INVENTION

Hereinafter, embodiments to which the present technology is applied will be described with reference to the drawings.

First Embodiment

<Exemplary Configuration of Electronic Circuit>

The present technology relates to a transmission system using a slave element between elements as a transmission path in a case where a single master element and a plurality of slave elements are bus-connected in a daisy chain form and data is transmitted from a predetermined slave element to the master element.

For example, the present technology can be applied to an electronic circuit in which a plurality of Complementary Metal Oxide Semiconductor (CMOS) image sensors as the slave elements is connected to a processor as the master element and various electronic devices such as a compound-eye camera, a mobile phone, and a wearable device including such an electronic circuit. Note that an example will be described in which the slave element is an image sensor. However, the slave element is not limited to the image sensor and may be any element as long as the element can output data.

Figure 1:
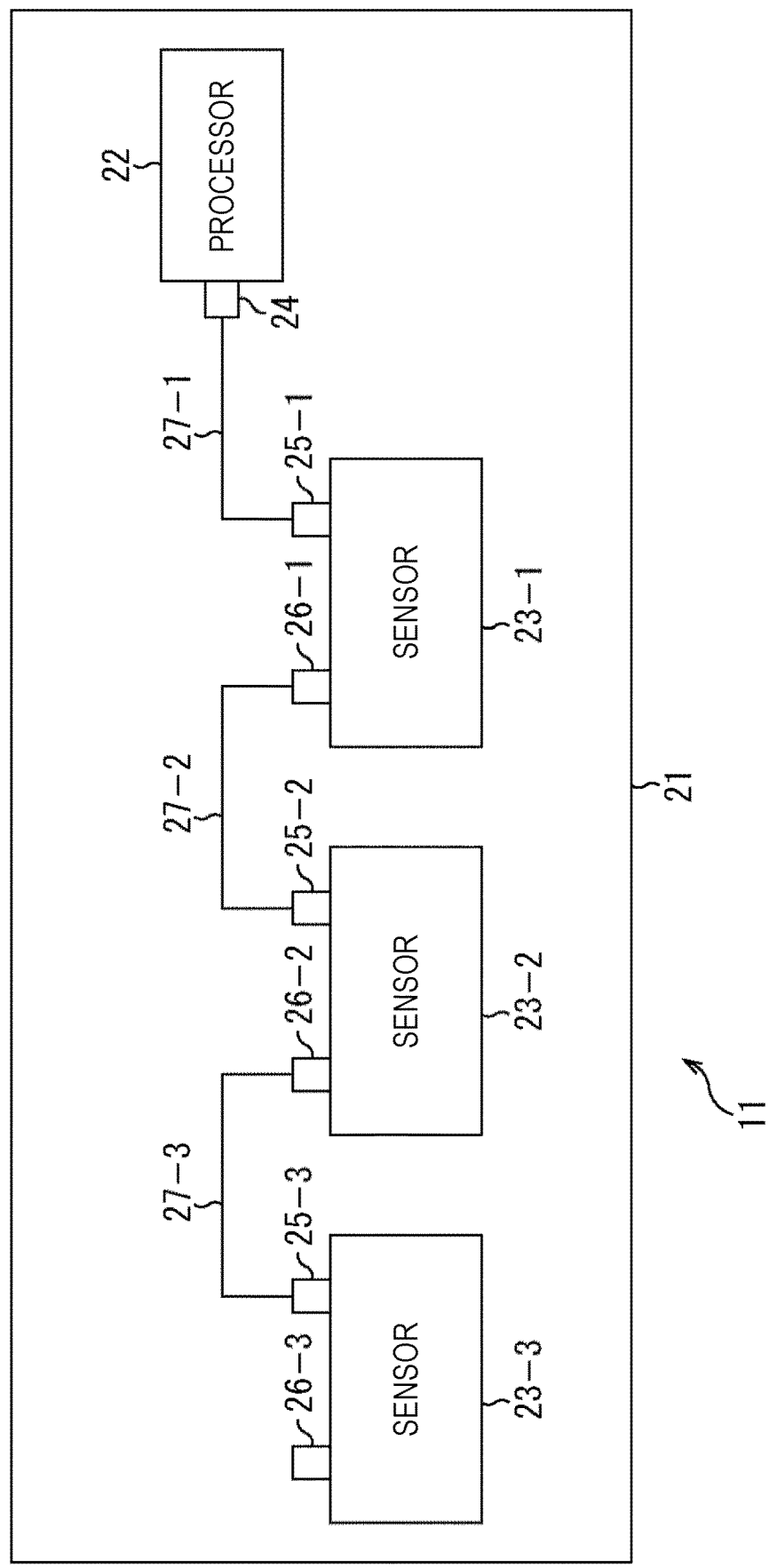
FIG. 1 is a diagram of an exemplary configuration of an electronic circuit to which the present technology is applied.

FIG. 1 is a diagram of an exemplary configuration according to an embodiment of an electronic circuit to which the present technology is applied.

An electronic circuit 11 illustrated in FIG. 1 is an integrated circuit including a substrate 21 including a laminated substrate, a flexible substrate, or the like and a processor 22 and sensors 23-1 to 23-3 mounted on the substrate 21. Note that in a case where it is not necessary to particularly distinguish the sensors 23-1 to 23-3 from each other, the sensors are simply referred to as a sensor 23.

For example, the processor 22 is connected to the substrate 21 by a pad 24 or other pads which are not illustrated. Similarly, the sensor 23-1 is connected to the substrate 21 with pads 25-1 and 26-1, the sensor 23-2 is connected to the substrate 21 with pads 25-2 and 26-2, and the sensor 23-3 is connected to the substrate 21 with pads 25-3 and 26-3.

Furthermore, the processor 22 and the sensor 23-1 are electrically connected by a connection wiring 27-1. In other words, the pad 24 provided in the processor 22 is connected to the pad 25-1 provided in the sensor 23-1 by the connection wiring 27-1 formed on the substrate 21.

Moreover, the sensors 23-1 and 23-2 are electrically connected with a connection wiring 27-2. In other words, the pad 26-1 provided in the sensor 23-1 is connected to the pad 25-2 provided in the sensor 23-2 by the connection wiring 27-2 formed on the substrate 21. Similarly, the sensors 23-2 and 23-3 are electrically connected to each other by a connection wiring 27-3. In other words, the pad 26-2 provided in the sensor 23-2 is connected to the pad 25-3 provided in the sensor 23-3 by the connection wiring 27-3 formed on the substrate 21.

Hereinafter, in a case where it is not necessary to particularly distinguish the pads 25-1 to 25-3 from each other, the pads are simply referred to as a pad 25, and in a case where it is not necessary to particularly distinguish the pads 26-1 to 26-3 from each other, the pads are simply referred to as a pad 26. In addition, hereinafter, in a case where it is not necessary to particularly distinguish the connection wirings 27-1 to 27-3 from each other, the connection wirings 27-1 to 27-3 are simply referred to as a connection wiring 27.

As described above, in the electronic circuit 11, the pad 25 of the sensor 23 is connected to the sensor 23 adjacently connected to the sensor 23 and is provided on the side of the processor 22 or the processor 22 via the connection wiring 27. Furthermore, the pad 26 of the sensor 23 is connected to the sensor 23 that is adjacently connected to the sensor 23 to the opposite side of the processor 22 via the connection wiring 27.

For example, the sensor 23 is an image sensor such as a CMOS image sensor and captures an image by receiving light entered from an object and photoelectrically converting the light. In the electronic circuit 11, for example, data of an image captured by the sensor 23, that is, image data is transmitted to the processor 22 as transmission data.

In this example, each sensor 23 that functions as a transmitter for transmitting the transmission data serves as a slave element and controls an operation of the sensor 23, and the processor 22 that functions as a receiver for receiving the transmission data transmitted from an arbitrary sensor 23 serves as a master element. Note that an example will be described in which the three sensors 23 to be slave elements are provided. However, any number of slave elements may be provided as long as the number is two or more.

On the substrate 21, the processor 22 that is a master element and the plurality of sensors 23 that is a slave element are bus connected by the connection wirings 27, more specifically, are connected in a daisy chain form. Specifically, the sensors 23-1 to 23-3 are connected to each other by the connection wiring 27 in a row. In addition, the sensor 23-1 at the end portion of the plurality of sensors 23 connected in a row is connected to the processor 22 by the connection wiring 27-1. In other words, the processor 22 is connected to the plurality of sensors 23 so that the processor 22 is positioned at the end portion of the bus connection.

In the electronic circuit 11, a single transmission path is formed by the wirings in the sensor 23 connected in this way and the connection wiring 27, and the processor 22 can receive transmission data output from an arbitrary sensor 23 through the transmission path.

At this time, the pad 26 provided in the sensor 23 functions as an input terminal of the transmission data supplied from the sensor 23 in a preceding stage, and the pad 25 provided in the sensor 23 functions as an output terminal for outputting the transmission data to the sensor 23 in a subsequent stage or the processor 22.

Figure 2:
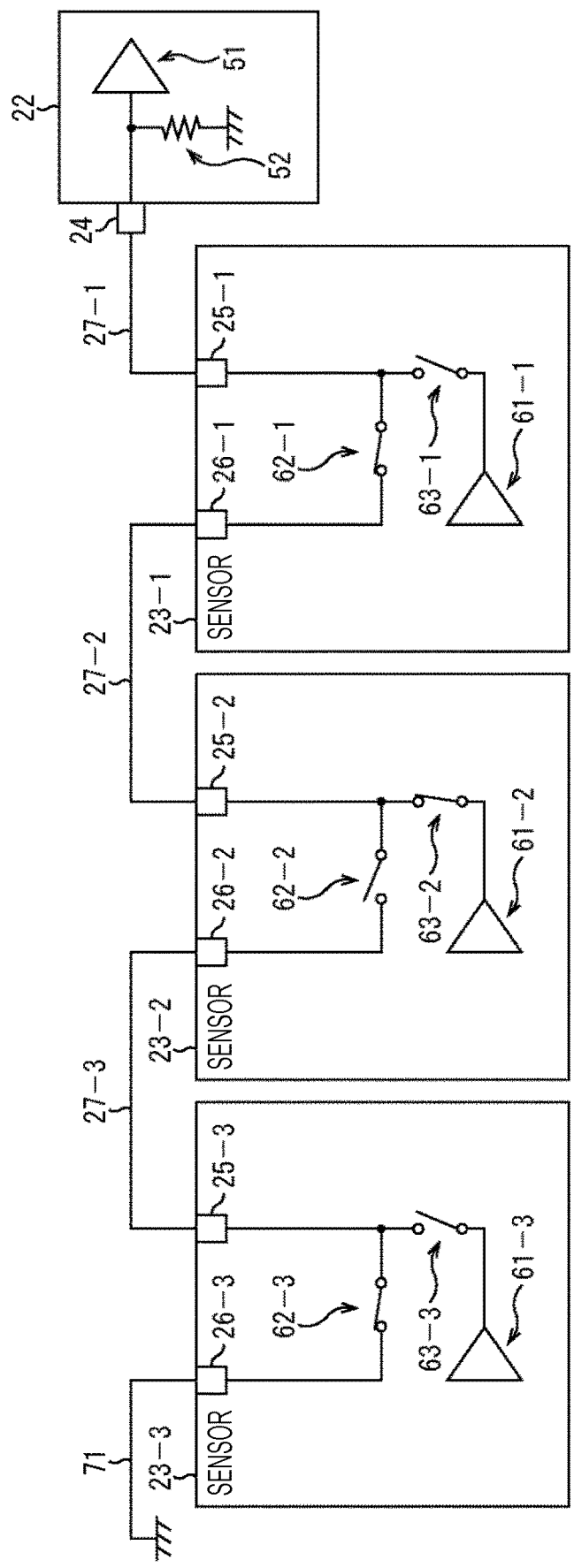
FIG. 2 is a diagram of an exemplary configuration of sensors and a processor.

Furthermore, the processor 22 and the sensor 23 have, for example, a configuration illustrated in FIG. 2 as a configuration for exchanging the transmission data. Note that parts in FIG. 2 corresponding to those in FIG. 1 are denoted with the same reference numerals, and the description thereof will be appropriately omitted.

In the example illustrated in FIG. 2, the processor 22 includes a reception unit 51 that is a receiver for receiving the transmission data and a resistor 52 that is a termination resistor, and the reception unit 51 and the resistor 52 are connected to the pad 24 via the wiring.

Furthermore, the sensor 23-1 includes a driver 61-1, a switch 62-1, and a switch 63-1.

In the sensor 23-1, the switch 62-1 is provided between the pads 25-1 and 26-1. Specifically, the switch 62-1 is provided in a section between the pad 26-1 and the pad 25-1 used as the transmission path of the transmission data and is connected to the transmission path in series.

Accordingly, when the switch 62-1 is turned on, the pads 25-1 and 26-1 are electrically connected to each other, and when the switch 62-1 is turned off, the pads 25-1 and 26-1 are electrically disconnected.

Moreover, the pad 25-1 is connected to the driver 61-1 via the switch 63-1. In other words, the driver 61-1 is connected to the transmission path of the transmission data via the switch 63-1. The driver 61-1 is connected to a pixel array unit (not shown) provided in the sensor 23-1 and is a data transmission unit that outputs image data obtained by the pixel array unit as transmission data.

Furthermore, the sensors 23-2 and 23-3 have a similar structure to that of the sensor 23-1.

In other words, the sensor 23-2 includes a driver 61-2, a switch 62-2, and a switch 63-2, and the driver 61-2 and the switches 62-2 and 63-2 respectively correspond to the driver 61-1 and the switches 62-1 and 63-1 of the sensor 23-1. That is, the driver 61-2 and the switches 62-2 and 63-2 have the same connection relationship as the driver 61-1 and the switches 62-1 and 63-1 of the sensor 23-1.

Furthermore, the sensor 23-3 includes a driver 61-3, a switch 62-3, and a switch 63-3, and the driver 61-3 and the switches 62-3 and 63-3 respectively correspond to the driver 61-1 and the switches 62-1 and 63-1 of the sensor 23-1. That is, the driver 61-3 and the switches 62-3 and 63-3 have the same connection relationship as the driver 61-1 and the switches 62-1 and 63-1 of the sensor 23-1.

Note that, in a case where it is not necessary to particularly distinguish the drivers 61-1 to 61-3 from each other, the drivers are simply referred to as a driver 61. Furthermore, in a case where it is not necessary to particularly distinguish the switches 62-1 to 62-3 from each other, the switches are simply referred to as a switch 62, and in a case where it is not necessary to particularly distinguish the switches 63-1 to 63-3 from each other, the switches are simply referred to as a switch 63.

Furthermore, an example will be described here in which each one of all the sensors 23 includes the switch 63 and the driver 61. However, it is preferable that the switch 63 and the driver 61 be provided at least in a sensor 23 that is a transmission source of the transmission data.

In addition, in the electronic circuit 11, the pad 26-3 of the sensor 23-3 is connected to a ground via a wiring 71 provided on the substrate 21. In other words, in the electronic circuit 11, the pad 26-3 of the sensor 23-3 that is a terminal of the bus connection is not connected to the termination resistor.

In this way, in the substrate 21, the connection wiring 27 provided on the substrate 21, and the pad 25, the switch 62, and the pad 26, which are provided in the sensor 23 and connect between the two connection wirings 27, form the transmission path when the transmission data is transmitted from a predetermined sensor 23 to the processor 22. In other words, the switch 62 and the like provided in the sensor 23 is used as the transmission path. Note that, more specifically, the connection wirings are provided between the pad 25 and the switch 62 and between the pad 26 and the switch 62, and the connection wirings also form the transmission path of the transmission data.

Here, in each sensor 23, the switch 62 is connected to the transmission path of the transmission data in series, and the switch 63 is provided between the driver 61 and the transmission path in series.

With the above configuration, only the switch 62 that is a passive component (passive element) is arranged as an element between the pads 25 and 26 in the sensor 23 to be the transmission path of the transmission data.

Furthermore, at the time of transmitting and receiving the transmission data, the processor 22 selects a sensor 23 to be a transmission source of the transmission data and controls the connection states of the sensors 23 according to the selection result.

Figure 3:
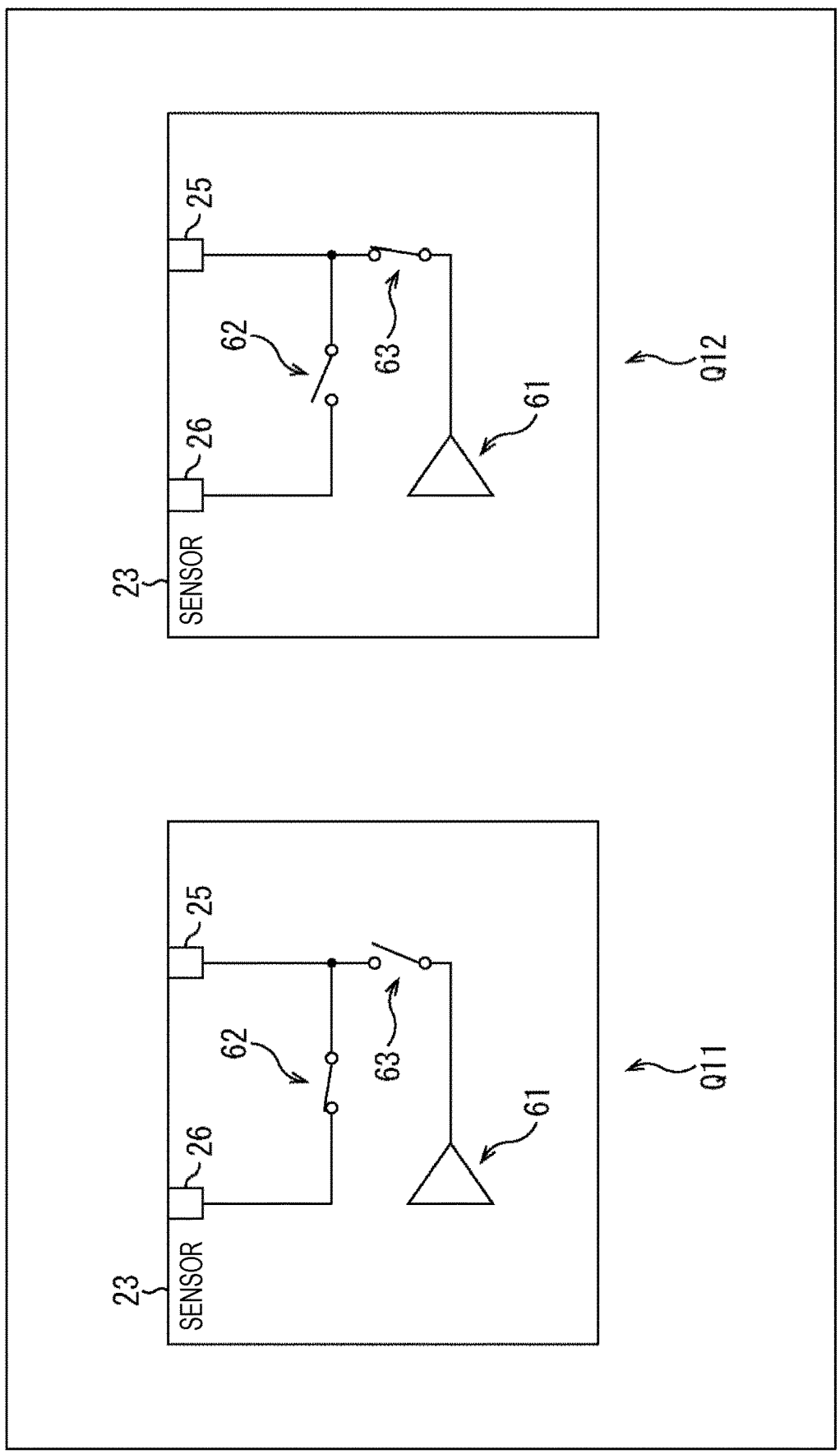
FIG. 3 is a diagram for describing a connection state of the sensors.

For example, according to whether or not the sensor 23 is the transmission source of the transmission data, the connection states of the switches 62 and 63 in the sensor 23 are controlled to be a state illustrated in FIG. 3. Note that parts in FIG. 3 corresponding to those in FIG. 2 are denoted with the same reference numerals, and the description thereof will be appropriately omitted.

In a case where the sensor 23 is not the transmission source of the transmission data, for example, the processor 22 turns on the switch 62 and turns off the switch 63 as indicated by an arrow Q11. In other words, the switch 62 is connected, and the switch 63 is released.

As a result, the pads 25 and 26 are electrically connected to each other, and the path between the pads 25 and 26 can be used as a transmission path, and the driver 61 is electrically disconnected from the pad 25, that is, the transmission path. In this case, only the switch 62 that is a passive component is arranged between the pads 25 and 26 in the sensor 23 to be the transmission path of the transmission data.

Furthermore, by electrically disconnecting the driver 61 that is not used to transmit the transmission data from the transmission path, reflection that occurs in the driver 61 can be prevented. As a result, deterioration in a waveform of the transmission data caused by the reflection can be prevented, and the processor 22 can receives the transmission data with an excellent waveform. That is, transmission characteristics of the transmission data can be improved.

On the other hand, in a case where the sensor 23 is the transmission source of the transmission data, for example, the processor 22 turns off the switch 62 and turns on the switch 63 as indicated by an arrow Q12. In other words, the switch 62 is released, and the switch 63 is connected.

With this state, the transmission data from the driver 61 is output to the pad 25, that is, the transmission path connected to the processor 22 via the switch 63.

In addition, since the switch 62 is released, the transmission data output from the driver 61 is not transmitted to the sensor 23 connected to the sensor 23 that is the transmission source and provided on the opposite side of the processor 22. Accordingly, the transmission data can be transmitted through the unidirectional transmission path formed between the sensor 23 that is the transmission source and the processor 22. In other words, the transmission data is transmitted to only the sensor 23 provided between the sensor 23 that is the transmission source and the processor 22, and the transmission data is not input to the other sensors 23.

Accordingly, reflection of the transmission data of the sensor 23 and the like provided at the opposite end to the processor 22 in the daisy chain connection can be prevented. With this structure, the transmission characteristics of the transmission data can be maximized, and an output of a current as the transmission data in the driver 61 can be reduced to be low. That is, sufficient transmission characteristics can be obtained with low power consumption.

Note that, for example, in the example illustrated in FIG. 2, the connection states and the opening and closing of the switches 62 and 63 are controlled so that the sensor 23-2 serves as the transmission source of the transmission data and the other sensors 23-1 and 23-3 serve as sensors that are not the transmission source.

Accordingly, in this example, the transmission data output from the driver 61-2 is transmitted through the sensor 23-1 and is received by the processor 22. At this time, since the switch 62-2 in the sensor 23-2 that is the transmission source is turned off, the transmission data output from the driver 61-2 is transmitted to the sensor 23-3, and the reflection of the transmission data does not occur in the sensor 23-3 and at a terminal end of the wiring 71.

If the switch 62-2 is turned on, the transmission data output from the driver 61-2 is transmitted to the sensor 23-3 via the switch 62-2 and the connection wiring 27-3, and the reflection of the transmission data occurs in the wiring 71 and the like.

Then, a signal caused by the reflection is superimposed on the transmission data received by the processor 22 as a noise, and the noise deteriorates the waveform. Since the transmission characteristics are deteriorated with this deterioration, it is necessary to provide the termination resistor in the wiring 71, and power consumption is increased. However, in the electronic circuit 11, by turning off the switch 62-2, the deterioration in the transmission characteristics and the increase in the power consumption can be prevented.

Furthermore, in a case where the sensor 23-2 is selected as a transmission source sensor, the switch 62-3 may be turned off. However, by connecting all the switches 62 of the sensors 23 provided farther than the sensor 23-2 that is the transmission source from the processor 22 and connecting the pad 26-3 of the sensor 23-3 at the terminal end to the ground via the wiring 71, it is possible to prevent the sensor 23-3 from generating noise. In other words, the pad 26-3 of the sensor 23-3 located farthest from the processor 22 is connected to the transmission path of the substrate 21 with a low impedance so that the sensor 23-3 can be prevented from generating a noise.

<Description of Transmission Processing>

Figure 4:
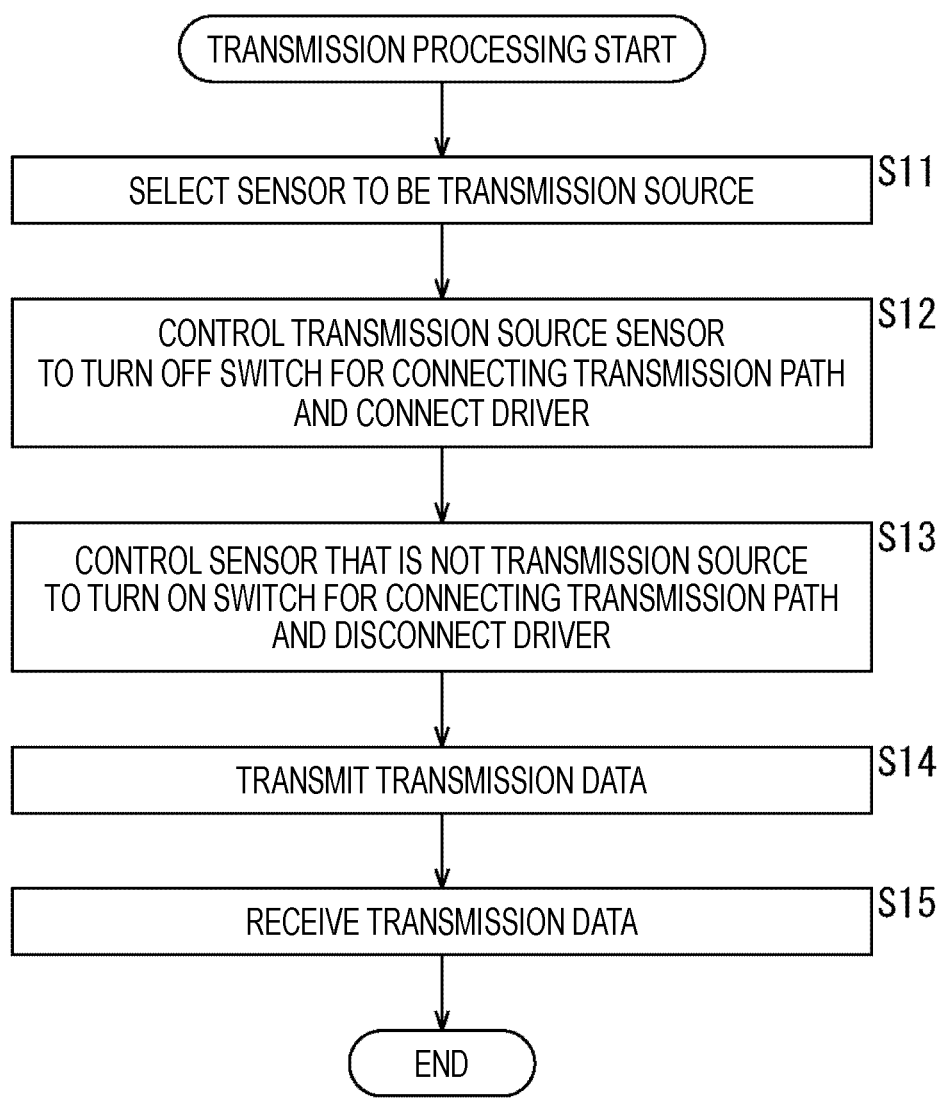
FIG. 4 is a flowchart for describing transmission processing.

Next, transmission processing by the electronic circuit 11 will be described with reference to the flowchart in FIG. 4. The transmission processing is performed when an image is captured by the sensor 23 and transmission of image data obtained by capturing the image to the processor 22 is started.

In step S11, the processor 22 selects the sensor 23 to be the transmission source of the transmission data. In other words, the processor 22 selects any one of the sensors 23-1 to 23-3 as the transmission source sensor 23.

In step S12, the processor 22 controls the sensor 23 selected as the transmission source to turn off the switch 62 for connecting the transmission path in the sensor 23 and to connect the driver 61.

The sensor 23 that is the transmission source turns off, that is, releases the switch 62 for connecting the transmission path according to the control of the processor 22 and turns on, that is, connects the switch 63 to connect the driver 61 to the transmission path, more specifically, to the pad 25.

In step S13, the processor 22 controls the sensor 23 that is not a transmission source to turn on the switch 62 for connecting the transmission path in the sensor 23 and to electrically disconnect the driver 61 from the transmission path and to make the driver 61 be in the non-connection state.

The sensor 23 that is not the transmission source turns on, that is, connects the switch 62 for connecting the transmission path according to the control of the processor 22 and turns off, that is, releases the switch 63 so as to electrically disconnect the driver 61 from the transmission path.

For example, in the example illustrated in FIG. 2, the sensor 23-2 is the transmission source, and the switch 62-2 is released, and the switch 63-2 is connected. Furthermore, the sensors 23-1 and 23-3 are not the transmission source, the switches 62-1 and 62-3 are connected, and the switches 63-1 and 63-3 are released.

Note that the example has been described here in which, in all the sensors 23 other than the sensor 23 that is the transmission source, the switch 62 is connected, and the switch 63 is released. However, at least in the sensor 23 connected between the sensor 23 to be the transmission source and the processor 22, it is preferable that the switch 62 be connected and the switch 63 be released.

In step S14, the driver 61 of the transmission source sensor 23 transmits the image data as the transmission data according to the control of the processor 22.

For example, in the example of FIG. 2, the driver 61-2 of the sensor 23-2 that is the transmission source transmits the transmission data. The transmission data transmitted in this way is output to the transmission path including the connection wiring 27 via the switch 63-2 and the switch 62 of the sensor 23 and is transmitted to the processor 22 through the transmission path.

In step S15, the reception unit 51 of the processor 22 receives the transmission data transmitted from the sensor 23 that is the transmission source via the transmission path, and the transmission processing is terminated. In the electronic circuit 11, such transmission processing is repeated, and the transmission data can be sequentially output from the sensors 23.

As described above, the processor 22 turns off the switch 62 of the sensor 23 that is the transmission source and turns on the switch 63 to connect the driver 61 and makes the driver 61 transmit the transmission data. Furthermore, the processor 22 turns on the switch 62 of the sensor 23 that is not the transmission source and turns off the switch 63 to disconnect the driver 61.

With this operation, the occurrence of the reflection of the transmission data can be prevented, and sufficient transmission characteristics can be obtained. In addition, power consumption of the driver 61 can be reduced. As a result, for example, a speed to transmit the transmission data can be improved, and transmission of data can be realized with lower power consumption even at the same transmission speed.

Second Embodiment

<Exemplary Configuration of Electronic Circuit>

In the electronic circuit 11 illustrated in FIG. 1, the processor 22 needs to monitor a transmission state of the transmission data by the driver 61 of the sensor 23 to select the sensor 23 to be the transmission source from among the plurality of sensors 23. In this case, it is necessary for the electronic circuit 11 to constantly monitor the transmission state of the transmission data and sequentially instruct each sensor 23 to start the transmission of the transmission data on the basis of the monitoring result.

Therefore, it is possible to more easily control transmission of the transmission data by making a state signal indicating the transmission state of the transmission data between the sensors 23 and between the sensor 23 and the processor 22 be exchanged.

Figure 5:
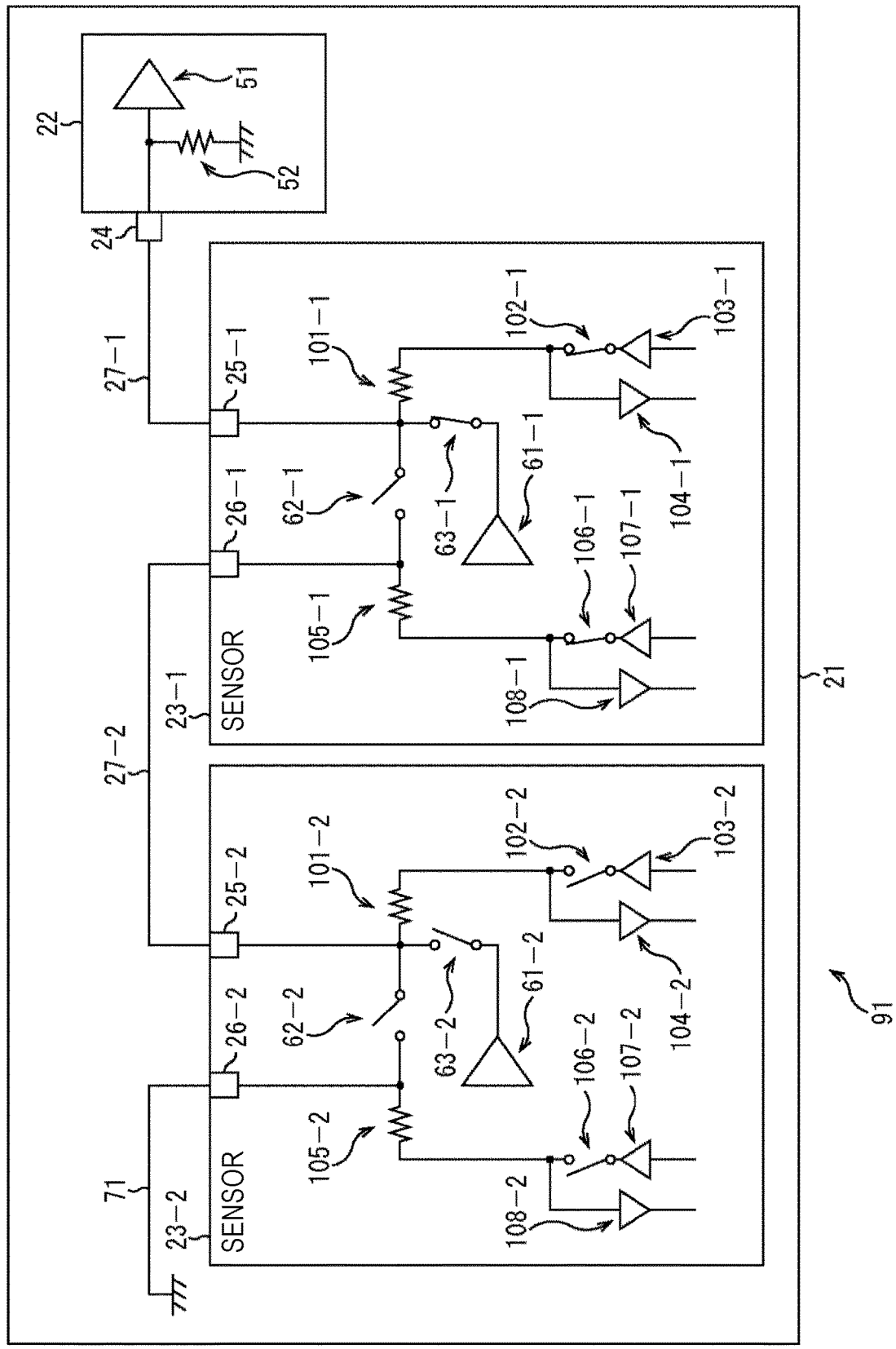
FIG. 5 is a diagram of an exemplary configuration of an electronic circuit.

In such a case, the electronic circuit is configured, for example, as illustrated in FIG. 5. Note that parts in FIG. 5 corresponding to those in FIG. 1 or 2 are denoted with the same reference numerals, and the description thereof will be appropriately omitted.

An electronic circuit 91 illustrated in FIG. 5 includes a substrate 21, a processor 22 and sensors 23-1 and 23-2 mounted on the substrate 21.

In the electronic circuit 91, the processor 22 and the sensors 23-1 and 23-2 are daisy-chain-connected, the processor 22 is used as a master element, and the sensor 23 is used as a slave element.

In other words, a pad 24 of the processor 22 is connected to a pad 25-1 of the sensor 23-1 with a connection wiring 27-1 formed on the substrate 21, and a pad 26-1 of the sensor 23-1 is connected to a pad 25-2 of the sensor 23-2 with a connection wiring 27-2 formed on the substrate 21. Furthermore, a pad 26-2 of the sensor 23-2 is connected to a ground via a wiring 71 formed on the substrate 21.

Moreover, in this example, in addition to the driver 61 to the switch 63 illustrated in FIG. 2, the sensor 23-1 further includes a switch 102-1, a driver 103-1, a reception unit 104-1, a switch 106-1, a driver 107-1, and a reception unit 108-1.

In other words, the pad 25-1 of the sensor 23-1 is connected to the switch 102-1 and the reception unit 104-1 via a resistor 101-1, and the switch 102-1 is connected to the driver 103-1. Here, the switch 102-1 is provided in series between the driver 103-1 and the resistor 101-1.

The driver 103-1 functions as a state signal transmitting unit that transmits a state signal indicating a transmission state of the transmission data by the sensor 23-1, more specifically, a driver 61-1. The state signal is, for example, a low-speed signal output at the same timing as a synchronization signal such as a vertical synchronization signal.

The state signal transmitted from the driver 103-1 is output to the connection wiring 27-1 via the switch 102-1, the resistor 101-1, and the pad 25-1. That is, the state signal output from the driver 103-1 is transmitted to the processor 22 via the connection wiring 27-1 that is a transmission path of the transmission data.

Furthermore, the reception unit 104-1 receives a state signal of the other sensor 23 transmitted from outside to the sensor 23-1.

Moreover, the pad 26-1 of the sensor 23-1 is connected to the switch 106-1 and the reception unit 108-1 via the resistor 105-1, and the switch 106-1 is connected to the driver 107-1. Here, the switch 106-1 is provided in series between the driver 107-1 and the resistor 105-1.

The driver 107-1 functions as a state signal transmitting unit that transmits a state signal indicating a transmission state of the transmission data by the sensor 23-1, more specifically, the driver 61-1.

The state signal transmitted from the driver 107-1 is output to a connection wiring 27-2 via the switch 106-1, the resistor 105-1, and the pad 26-1. That is, the state signal output from the driver 107-1 is transmitted to the sensor 23-2 adjacent to the sensor 23-1 via the connection wiring 27-2.

Furthermore, the reception unit 108-1 receives a state signal of the other sensor 23 transmitted from outside to the sensor 23-1. Here, the reception unit 108-1 receives a state signal output from a driver 103-2 of the sensor 23-2.

Similar to the sensor 23-1, the sensor 23-2 further includes a switch 102-2, a driver 103-2, a reception unit 104-2, a switch 106-2, a driver 107-2, and a reception unit 108-2, in addition to the driver 61 to the switch 63 illustrated in FIG. 2. Furthermore, in the sensor 23-2, a resistor 101-2 is provided between the pad 25-2 and the switch 102-2 and the reception unit 104-2, and a resistor 105-2 is provided between the pad 26-2 and the switch 106-2 and the reception unit 108-2.

The resistor 101-2 to the reception unit 108-2 respectively correspond to the resistor 101-1 to the reception unit 108-1 of the sensor 23-1, and the connection relationships between the components of both sensors are the same.

Note that, in the following description, in a case where it is not necessary to particularly distinguish the resistors 101-1 and 101-2 from each other, the resistor is simply referred to as a resistor 101, and in a case where it is not necessary to particularly distinguish the switches 102-1 and 102-2 from each other, the switch is simply referred to as a switch 102.

Furthermore, in the following description, in a case where it is not necessary to particularly distinguish the drivers 103-1 and 103-2 from each other, the driver is simply referred to as a driver 103, and in a case where it is not necessary to particularly distinguish the reception units 104-1 and 104-2 from each other, the reception unit is simply referred to as a reception unit 104.

Moreover, in a case where it is not necessary to particularly distinguish the resistors 105-1 and 105-2 from each other, the resistor is simply referred to as a resistor 105, and in a case where it is not necessary to particularly distinguish the switches 106-1 and 106-2 from each other, the switch is simply referred to as a switch 106. Hereinafter, in a case where it is not necessary to particularly distinguish the drivers 107-1 and 107-2 from each other, the driver is simply referred to as a driver 107, and in a case where it is not necessary to particularly distinguish the reception units 108-1 and 108-2 from each other, the reception unit is simply referred to as a reception unit 108.

In the electronic circuit 91, the state signal transmitted from the driver 103 of the sensor 23 is received by the reception unit 108 of the sensor 23 connected to the side of the processor 22 of the sensor 23 and the processor 22. Furthermore, the state signal transmitted from the driver 107 of the sensor 23 is received by the reception unit 104 of the sensor 23 that is connected adjacently to the sensor 23 and provided on the opposite side of the processor 22.

In the electronic circuit 91 having such a configuration, in the sensor 23 that is the transmission source, the switch 62 is released, and the switches 63, 102, and 106 are connected.

Furthermore, from among the sensors 23 that are not the transmission sources, in the sensor 23 connected between the sensor 23 that is the transmission source and the processor 22, the switch 62 is connected, and the switches 63, 102, and 106 are released.

On the other hand, from among the sensors 23 that are not the transmission sources, in the sensor 23 connected to the sensor 23 that is the transmission source and provided on the opposite side of the processor 22, the switches 62, 63, 102, and 106 are released.

In the example illustrated in FIG. 5, the switch 62-1 is turned off, and the switches 63-1, 102-1, and 106-1 are turned on. Therefore, it is found that the sensor 23-1 is the transmission source sensor. In this case, in the sensor 23-2 that is not the transmission source, all the switches 62-2, 63-2, 102-2, and 106-2 are turned off.

Then, the connection wiring 27-2 that is not connected to the processor 22 that is a master element and the sensor 23-1 that is a transmission source slave element, that is, is not used as a transmission path of the transmission data is used as the transmission path (signal line) of the state signal between the sensors 23. With this structure, after the sensor 23 that is the transmission source has transmitted the transmission data, the sensor 23 to be the transmission source can be immediately switched. In other words, the transmission of the transmission data from each sensor 23 can be seamlessly performed.

Figure 6:
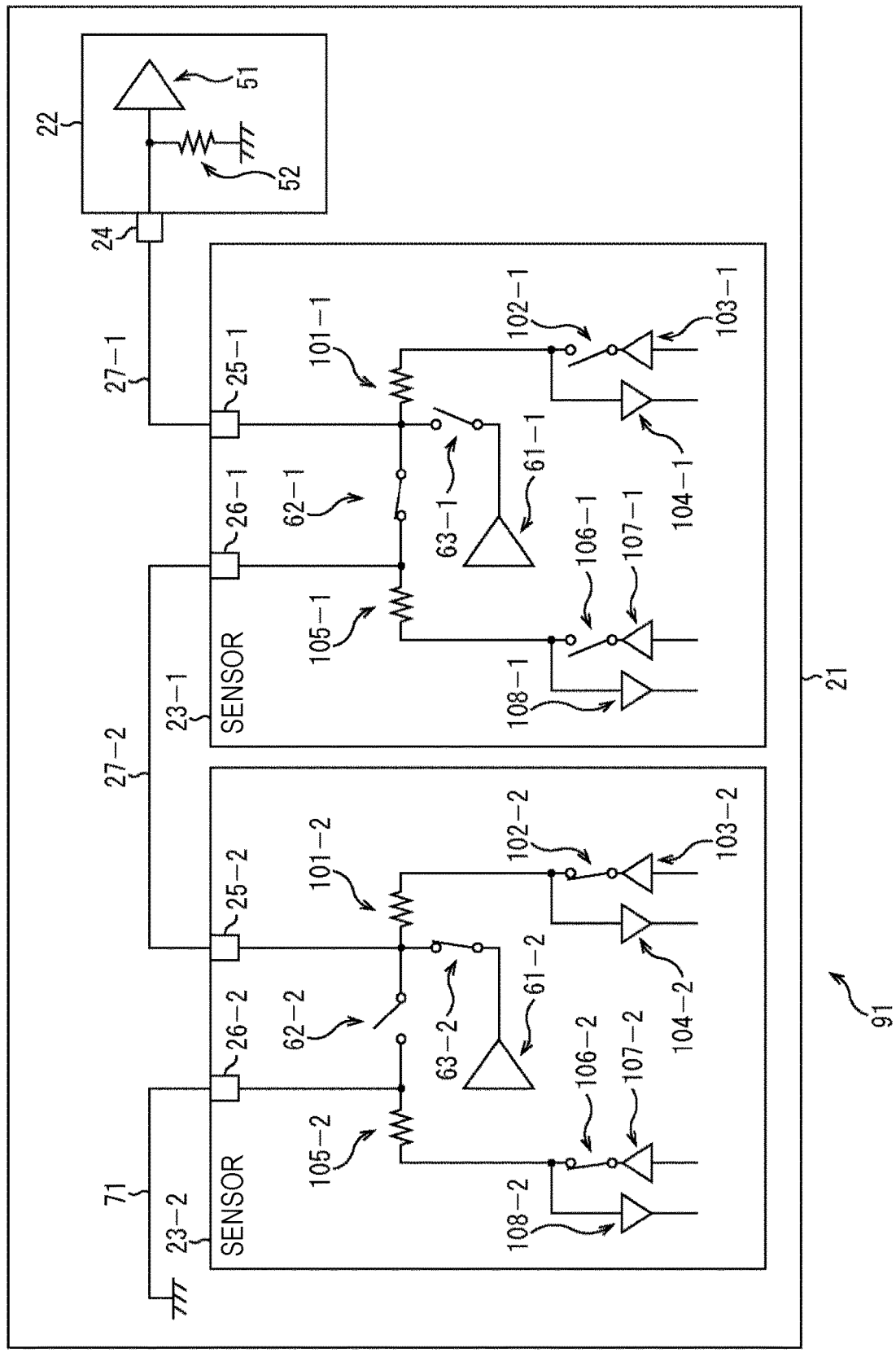
FIG. 6 is a diagram for describing a connection state of the sensors.

In this way, in the example illustrated in FIG. 5, the connection state in which the sensor 23-1 is the transmission source is illustrated. However, in a case where the sensor 23-2 is the transmission source, the connection state is as illustrated in FIG. 6. Note that parts in FIG. 6 corresponding to those in FIG. 5 are denoted with the same reference numerals, and the description thereof will be appropriately omitted.

In the example illustrated in FIG. 6, the sensor 23-2 serves as the transmission source. Therefore, in the sensor 23-2, the switch 62-2 is turned off, and the switches 63-2, 102-2, and 106-2 are turned on.

On the other hand, in the sensor 23-1 that is not the transmission source and is connected between the transmission source sensor 23-2 and the processor 22, the switch 62-1 is turned on, and the switches 63-1, 102-1, and 106-1 are turned off.

<Operation of Electronic Circuit>

Next, an operation of the electronic circuit 91 illustrated in FIG. 5 will be described with reference to a timing chart in FIG. 7.

Figure 7:
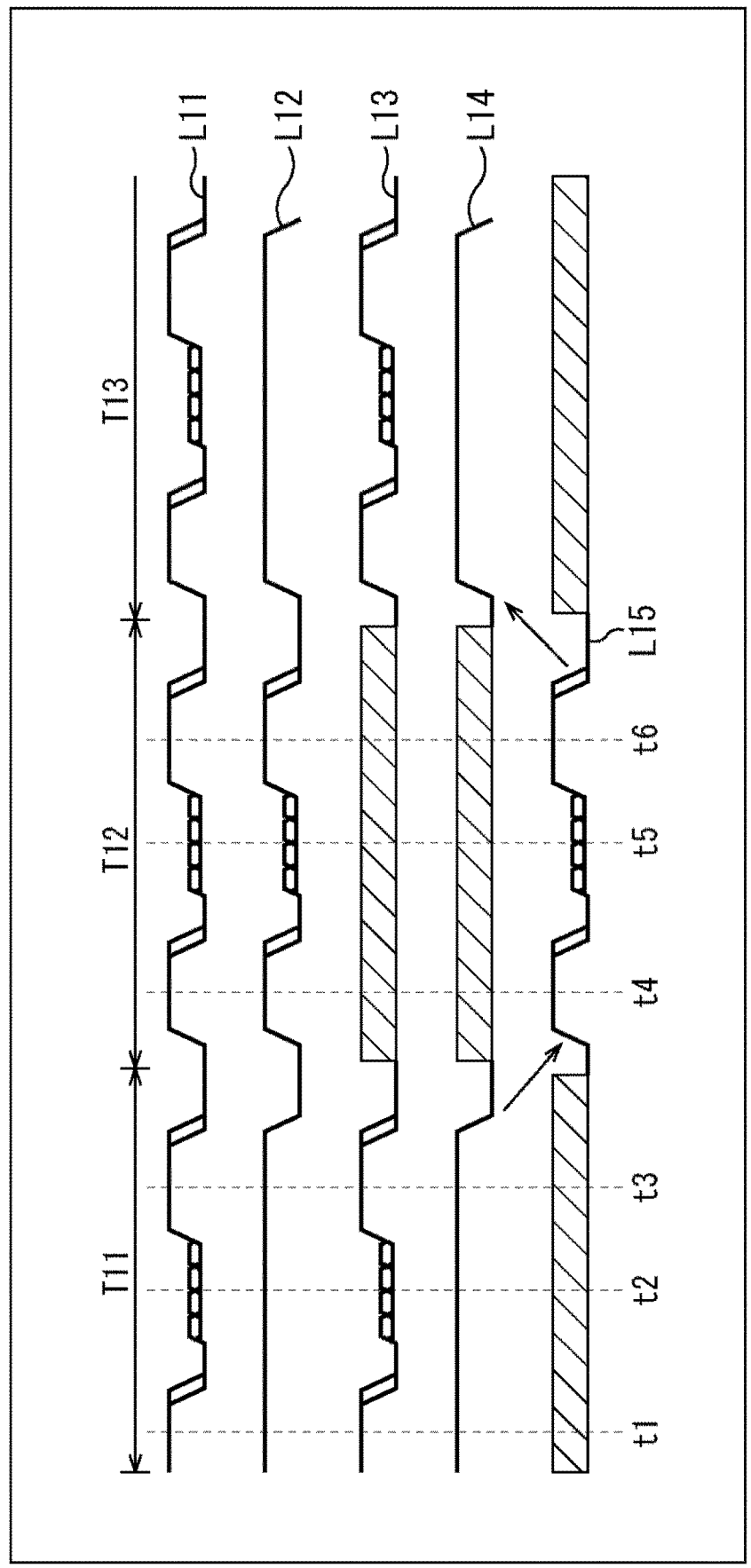
FIG. 7 is a diagram for describing an operation of the electronic circuit.

Note that the horizontal direction in FIG. 7 indicates time, and the vertical direction indicates a voltage level of the connection wiring and an output voltage level of the driver. In other words, a broken line L11 indicates a voltage level of the connection wiring 27-1, and a broken line L12 indicates a voltage level of the connection wiring 27-2. Furthermore, a broken line L13 indicates an output voltage level of the driver 61-1 or the driver 103-1, a broken line L14 indicates an output voltage level of the driver 107-1, and a broken line L15 indicates an output voltage level of the driver 61-2 or the driver 103-2. Moreover, a hatched portion in FIG. 7 indicates a state where the driver outputs no signal, that is, a high impedance state.

First, the processor 22 selects the sensor 23-1 as a sensor to be the transmission source, controls connection states of the sensors 23-1 and 23-2 according to the selection result, and instructs the sensor 23-1 to transmit the transmission data.

Then, each sensor 23 controls the connection state of each switch according to the control of the processor 22. With this control, the connection state as illustrated in FIG. 5 is made.

Then, at a time t1, the driver 103-1 outputs a state signal indicating that the transmission of the transmission data is started. The state signal from the driver 103-1 is output to the connection wiring 27-1 via the switch 102-1, the resistor 101-1, and the pad 25-1, is transmitted to the processor 22, and is received by the reception unit 51. The processor 22 that has received such a state signal can recognize that the transmission data will be transmitted from the sensor 23-1 now.

Furthermore, at the time t1, the driver 107-1 outputs a state signal indicating that the transmission data is transmitted. The state signal is transmitted to the reception unit 104-2 via the switch 106-1, the resistor 105-1, the pad 26-1, the connection wiring 27-2, the pad 25-2, and the resistor 101-2 and is received by the reception unit 104-2.

With this transmission, the sensor 23-2 can recognize that the sensor 23-1 is transmitting the transmission data. Note that the state signal indicating that the transmission data is transmitted is continuously output from the driver 107-1 until the transmission of the transmission data by the sensor 23-1 is completed.

When the state signal is output from the driver 103-1 at the time t1, thereafter, the driver 61-1 outputs the transmission data at a time t2. The transmission data is transmitted to the processor 22 via the switch 63-1, the pad 25-1, and the connection wiring 27-1 and is received by the reception unit 51 of the processor 22.

Then, when the transmission of the transmission data from the sensor 23-1 has been completed, the driver 103-1 outputs a state signal indicating that the transmission of the transmission data has been completed at a time t3. The state signal from the driver 103-1 is output to the connection wiring 27-1 via the switch 102-1, the resistor 101-1, and the pad 25-1, is transmitted to the processor 22, and is received by the reception unit 51. The processor 22 that has received such a state signal can recognize that the transmission of the transmission data by the sensor 23-1 has been completed.

When the transmission of the transmission data has been completed in this way, thereafter, the driver 107-1 outputs a state signal indicating that the transmission of the transmission data has been completed. In other words, the driver 107-1 stops the output of the state signal indicating that the transmission data is transmitted.

With this operation, the sensor 23-2 can recognize that the transmission of the transmission data by the sensor 23-1 has been completed.

A period T11 including the times t1 to t3 described above is a period in which the sensor 23-1 transmits the transmission data as a transmission source.

When the transmission of the transmission data by the sensor 23-1 has been completed, that is, the period T11 ends, the sensors 23-1 and 23-2 changes the connection states of the switches to be the connection state illustrated in FIG. 6. With this operation, the sensor 23-2 turns to be the sensor that is the transmission source, and the sensor 23-1 turns to be the sensor that is not the transmission source, and the sensor 23-2 starts to transmit the transmission data.

In other words, at a time t4, the driver 103-2 outputs a state signal indicating that the transmission of the transmission data is started. The state signal from the driver 103-2 is output to the connection wiring 27-2 via the switch 102-2, the resistor 101-2, and the pad 25-2.

The state signal output to the connection wiring 27-2 in this way is further transmitted to the processor 22 via the pad 26-1, the switch 62-1, the pad 25-1, and the connection wiring 27-1, is received by the reception unit 51 of the processor 22, and is received by the reception unit 108-1 via the pad 26-1 and the resistor 105-1.

With this transmission, the processor 22 and the sensor 23-1 can recognize that the transmission data is transmitted by the sensor 23-2.

When the state signal is output from the driver 103-2 at the time t4, thereafter, the driver 61-2 outputs the transmission data at a time t5. The transmission data is output to the connection wiring 27-2 via the switch 63-2 and the pad 25-2.

The transmission data output to the connection wiring 27-2 in this way is further transmitted to the processor 22 via the pad 26-1, the switch 62-1, the pad 25-1, and the connection wiring 27-1 and is received by the reception unit 51 of the processor 22.

Then, when the transmission of the transmission data from the sensor 23-2 has been completed, the driver 103-2 outputs a state signal indicating that the transmission of the transmission data has been completed, at a time t6. The state signal from the driver 103-2 is transmitted to the processor 22 via the switch 102-2, the resistor 101-2, the pad 25-2, the connection wiring 27-2, the pad 26-1, the switch 62-1, the pad 25-1, and the connection wiring 27-1 and is received by the reception unit 51 of the processor 22.

Furthermore, the state signal from the driver 103-2 is transmitted to the reception unit 108-1 from the pad 26-1 via the resistor 105-1 and is received by the reception unit 108-1.

By receiving such a state signal, the processor 22 and the sensor 23-1 can recognize that the transmission of the transmission data by the sensor 23-2 has been completed.

A period T12 including the times t4 to t6 described above is a period in which the sensor 23-2 transmits the transmission data as a transmission source.

When the transmission of the transmission data by the sensor 23-2 has been terminated, thereafter, the sensors 23-1 and 23-2 changes the connection states of the switches to be the connection state illustrated in FIG. 5. With this operation, the sensor 23-1 turns to be the sensor that is the transmission source, and the sensor 23-2 turns to be the sensor that is not the transmission source, and the sensor 23-1 starts to transmit the transmission data. In other words, in a period T13 subsequent to the period T12, an operation similar to that in the period T11 is performed, and the sensor 23-1 transmits the transmission data. Similarly, after that, the sensors 23-2 and 23-1 are alternately set as the transmission source sensor and transmit the transmission data.

As described above, in the electronic circuit 91, the sensors 23-1 and 23-2 alternately transmit the transmission data to the processor 22. At this time, the state signals are exchanged between the sensors 23, and the sensor 23 can recognize a timing to start to transmit the transmission data by the state signal from the other sensor 23. Therefore, all the processor 22 need to do is to instruct the sensor 23 to start the transmission of the transmission data first. With this operation, the transmission data can be exchanged with more simple control.

Third Embodiment

<Exemplary Configuration of Electronic Circuit>

Furthermore, in the second embodiment, an example has been described in which the two sensors 23 having a configuration capable of exchanging the state signals are provided. However, the number of sensors 23 may be equal to or more than three.

Figure 8:
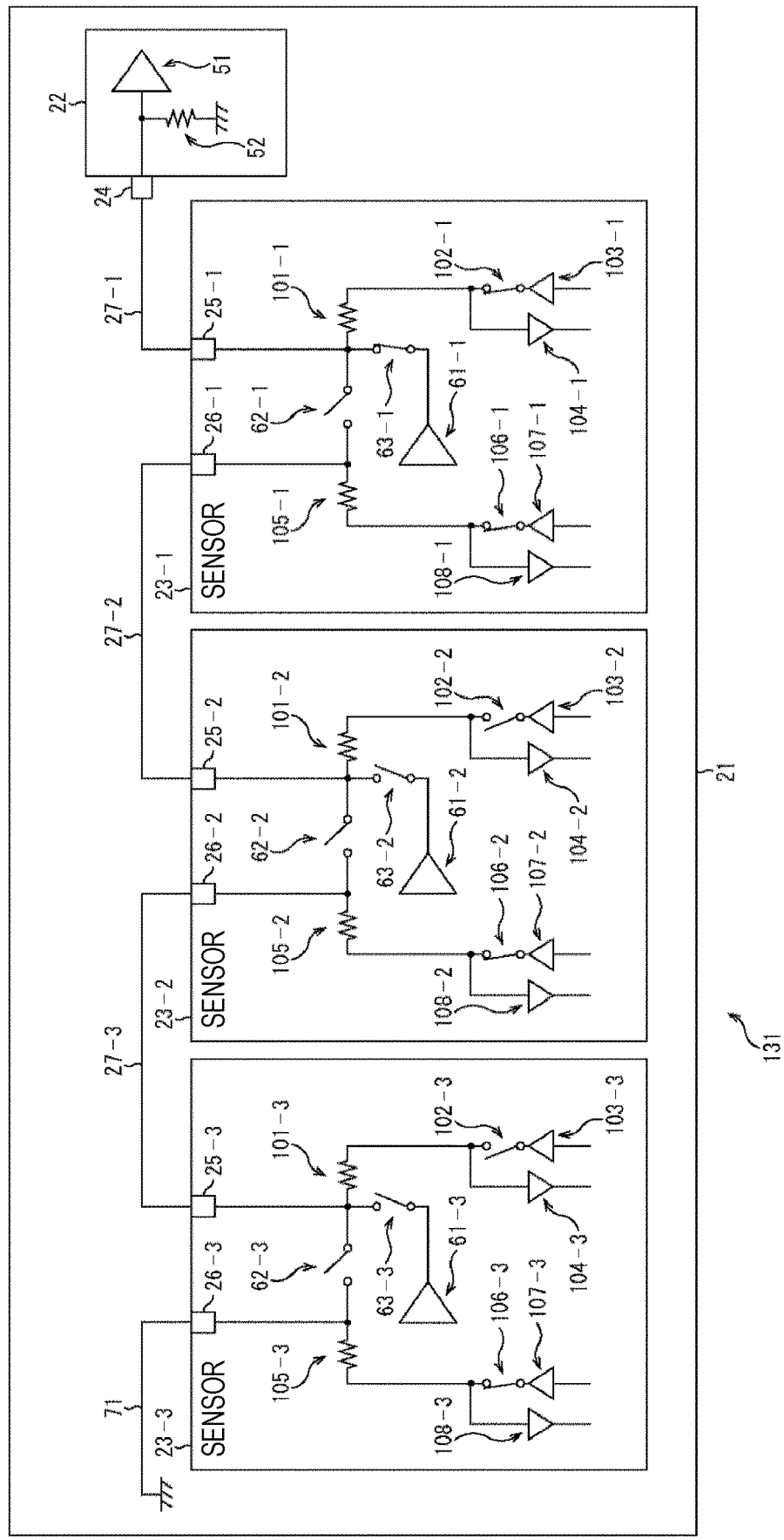
FIG. 8 is a diagram of an exemplary configuration of an electronic circuit.

For example, in a case where three sensors 23 capable of exchanging the state signals are provided, an electronic circuit can be configured as illustrated in FIG. 8. Note that parts in FIG. 8 corresponding to those in FIG. 2 or 5 are denoted with the same reference numerals, and the description thereof will be appropriately omitted.

An electronic circuit 131 illustrated in FIG. 8 includes a substrate 21, a processor 22 and sensors 23-1, 23-2, and 23-3 mounted on the substrate 21.

In the electronic circuit 131, the processor 22 and the sensors 23-1 to 23-3 are daisy-chain-connected with connection wirings 27, and the processor 22 is used as a master element, and the sensor 23 is used as a slave element.

In other words, a pad 24 of the processor 22 is connected to a pad 25-1 of the sensor 23-1 with a connection wiring 27-1 formed on the substrate 21, and a pad 26-1 of the sensor 23-1 is connected to a pad 25-2 of the sensor 23-2 with a connection wiring 27-2 formed on the substrate 21. Furthermore, a pad 26-2 of the sensor 23-2 is connected to a pad 25-3 of the sensor 23-3 with a connection wiring 27-3 formed on the substrate 21, and a pad 26-3 of the sensor 23-3 is connected to a ground via a wiring 71 formed on the substrate 21.

Moreover, in this example, in addition to the driver 61 to the switch 63, in the sensor 23-3, a switch 102-3, a driver 103-3, a reception unit 104-3, a switch 106-3, a driver 107-3, and a reception unit 108-3 respectively corresponding to the switches 102, the drivers 103, the reception units 104, the switches 106, the drivers 107, and the reception units 108 provided in the sensors 23-1 and 23-2 are provided.

Furthermore, resistors 101-3 and 105-3 respectively corresponding to the resistors 101 and 105 provided in the sensors 23-1 and 23-2 are provided in the sensor 23-3.

The resistor 101-3 to the reception unit 108-3 respectively correspond to the resistors 101 to the reception units 108 of the sensors 23-1 and 23-2, and the connection relationships between the components of both sensors are the same.

Note that, in the following description, in a case where it is not necessary to particularly distinguish the resistors 101-1 to 101-3 from each other, the resistors are simply referred to as a resistor 101, and in a case where it is not necessary to particularly distinguish the switches 102-1 to 102-3 from each other, the switch is simply referred to as a switch 102.

Furthermore, in the following description, in a case where it is not necessary to particularly distinguish the drivers 103-1 to 103-3 from each other, the driver is simply referred to as a driver 103, and in a case where it is not necessary to particularly distinguish the reception units 104-1 to 104-3 from each other, the reception unit is simply referred to as a reception unit 104.

Moreover, in a case where it is not necessary to particularly distinguish the resistors 105-1 to 105-3 from each other, the resistor is simply referred to as a resistor 105, and in a case where it is not necessary to particularly distinguish the switches 106-1 to 106-3 from each other, the switch is simply referred to as a switch 106. In the following description, in a case where it is not necessary to particularly distinguish the drivers 107-1 to 107-3 from each other, the driver is simply referred to as a driver 107, and in a case where it is not necessary to particularly distinguish the reception units 108-1 to 108-3 from each other, the reception unit is simply referred to as a reception unit 108.

In the electronic circuit 131 having such a configuration, in the sensor 23 that is the transmission source, the switch 62 is released, and the switches 63, 102, and 106 are connected.

Furthermore, from among the sensors 23 that are not the transmission sources, in the sensor 23 connected between the sensor 23 that is the transmission source and the processor 22, the switch 62 is connected, and the switches 63, 102, and 106 are released.

On the other hand, from among the sensors 23 that are not the transmission sources, in the sensor 23 connected to the sensor 23 that is the transmission source and provided on the opposite side of the processor 22, the switches 62, 63, and 102 are released, and the switch 106 is connected.

In this case, in the sensor 23 that is not the transmission source and is connected to the opposite side of the processor 22 as viewed from the sensor 23 that is the transmission source, the driver 107 outputs a state signal indicating that the transmission data is not transmitted. In other words, the driver 107 stops the output of the state signal indicating that the transmission data is transmitted.

As described above, in the example illustrated in FIG. 8, it can be found that the sensor 23-1 serves as a sensor that is the transmission source and the other sensors 23-2 and 23-3 do not serve as the transmission sources.

Figure 9:
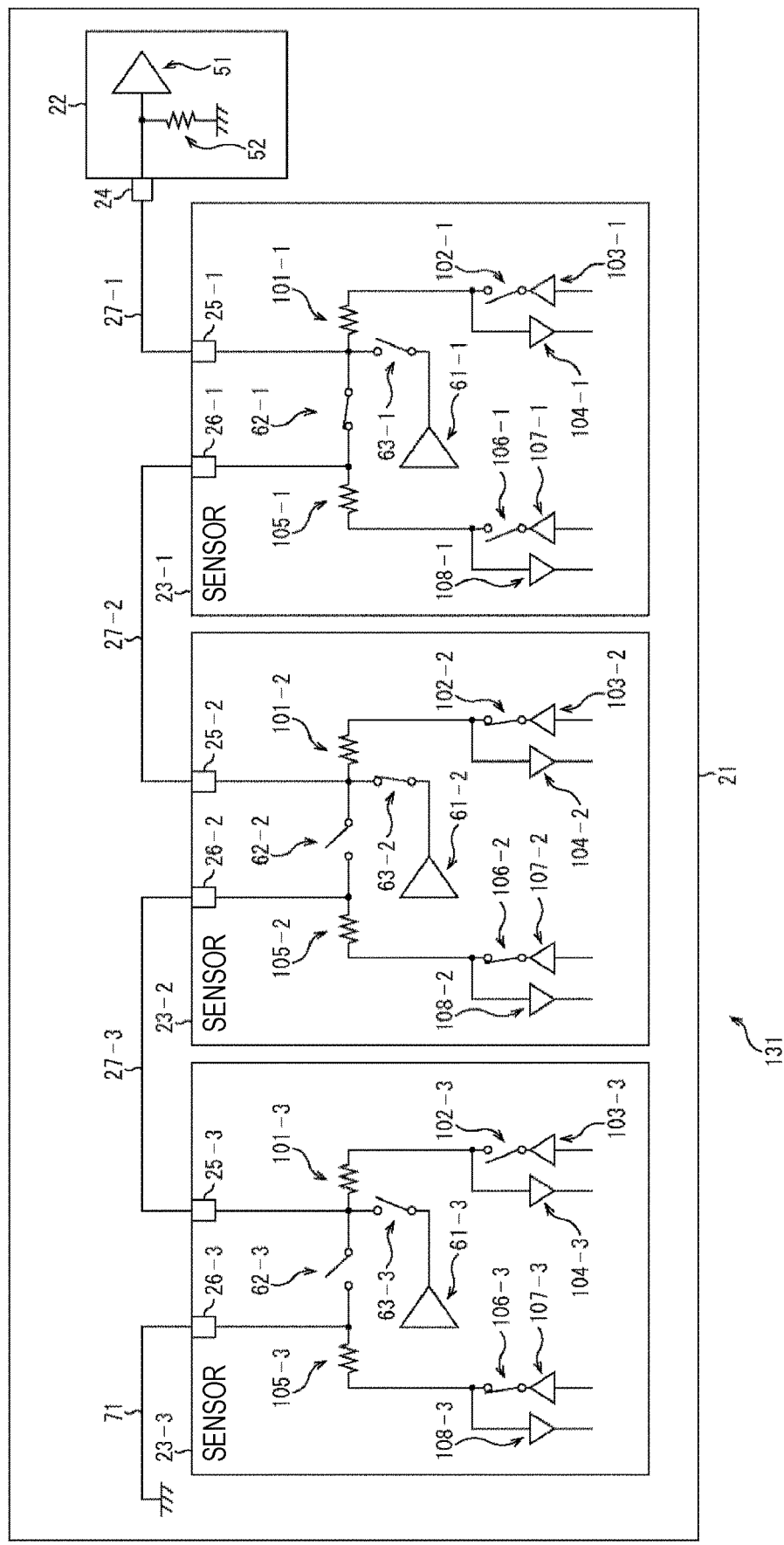
FIG. 9 is a diagram for describing a connection state of the sensors.
Figure 10:
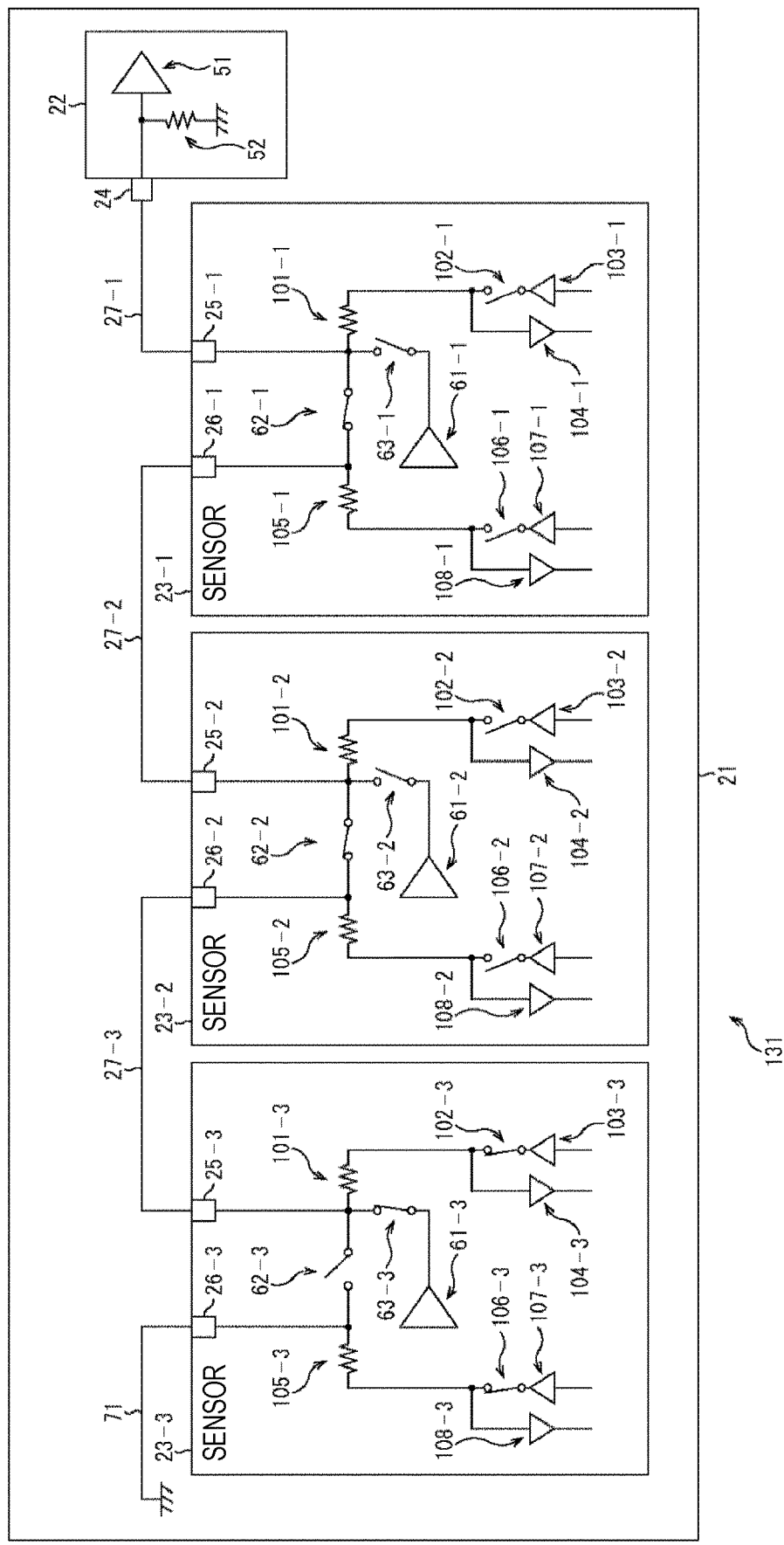
FIG. 10 is a diagram for describing a connection state of the sensors.

Furthermore, in a case where the sensor 23-2 serves as a transmission source, the connection state illustrated in FIG. 9 is made, and in a case where the sensor 23-3 serves as a transmission source, the connection state illustrated in FIG. 10 is made. Note that parts in FIGS. 9 and 10 corresponding to those in FIG. 8 are denoted with the same reference numerals, and the description thereof will be omitted.

In particular, in the example illustrated in FIG. 9, since the sensor 23-1 provided between the sensor 23-2 that is the transmission source and the processor 22 is used as the transmission path, the switch 62-1 is turned on. Furthermore, the other switches 63-1, 102-1, and 106-1 are turned off.

On the other hand, in FIG. 9, since the sensor 23-3 that is not provided between the sensor 23-2 that is the transmission source and the processor 22 is not used as a transmission path, the switch 62-3 is turned off. Furthermore, the switches 63-3 and 102-3 are turned off, and the switch 106-3 is turned on.

Furthermore, in the example illustrated in FIG. 10, the sensors 23-1 and 23-2 that are not the transmission sources are connected between the sensor 23-3 that is the transmission source and the processor 22. Therefore, in the sensors 23-1 and 23-2, the switch 62 is turned on, and the other switches 63, 102, and 106 are turned off.

<Operation of Electronic Circuit>

Next, an operation of the electronic circuit 131 illustrated in FIG. 8 will be described with reference to a timing chart in FIG. 11.

Figure 11:
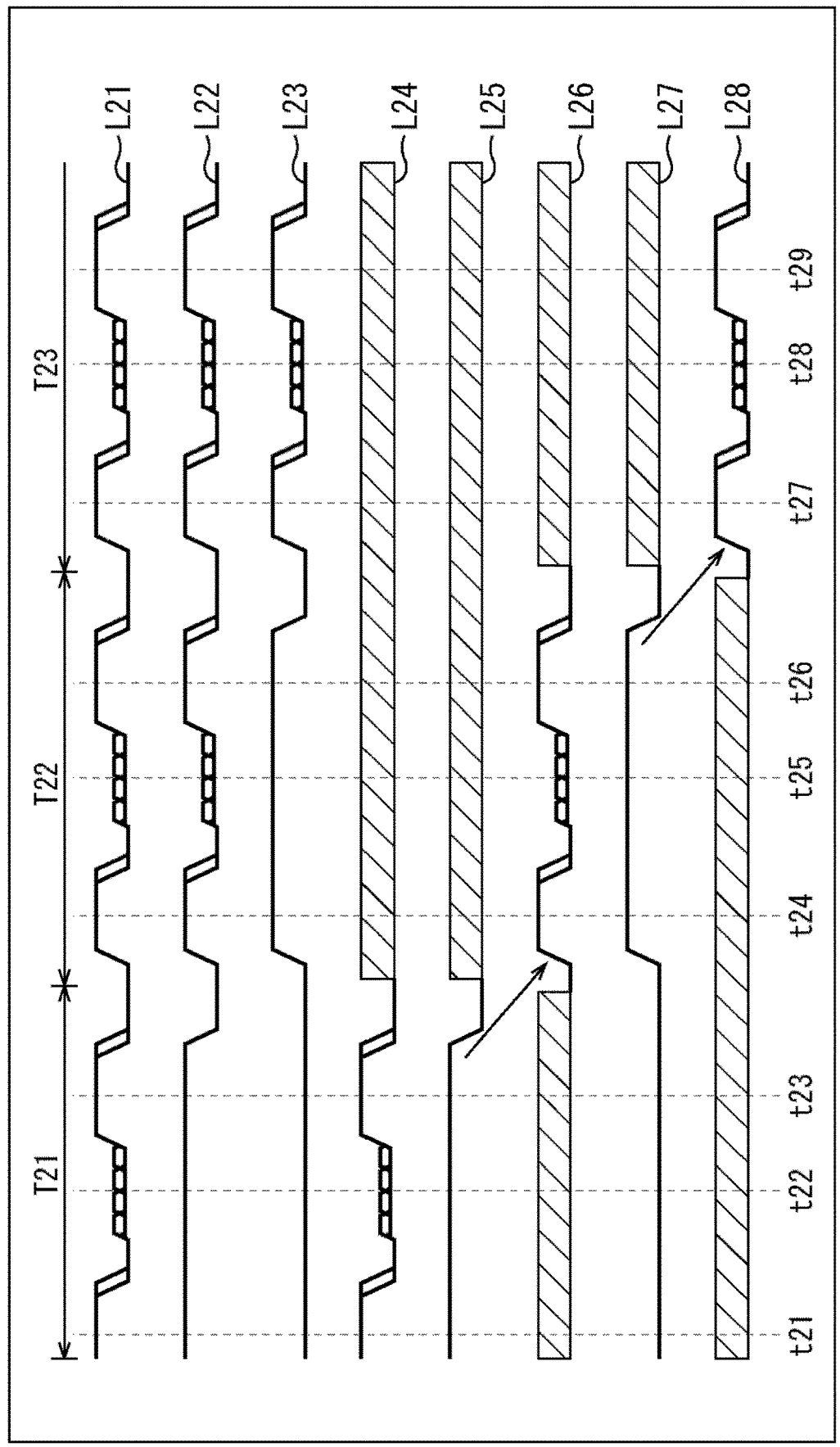
FIG. 11 is a diagram for describing an operation of the electronic circuit.

Note that the horizontal direction in FIG. 11 indicates time, and the vertical direction indicates a voltage level of the connection wiring and an output voltage level of the driver. In other words, a broken line L21 indicates a voltage level of the connection wiring 27-1, a broken line L22 indicates a voltage level of the connection wiring 27-2, and a broken line L23 indicates a voltage level of the connection wiring 27-3.

Furthermore, a broken line L24 indicates an output voltage level of the driver 61-1 or the driver 103-1, a broken line L25 indicates an output voltage level of the driver 107-1, and a broken line L26 indicates an output voltage level of the driver 61-2 or the driver 103-2. A broken line L27 indicates an output voltage level of the driver 107-2, and a broken line L28 indicates an output voltage level of the driver 61-3 or the driver 103-3. Moreover, a hatched portion in FIG. 11 indicates a state where the driver outputs no signal, that is, a high impedance state.

First, the processor 22 selects the sensor 23-1 as a sensor to be the transmission source, controls connection states of the sensors 23-1 to 23-3 according to the selection result, and instructs the sensor 23-1 to transmit the transmission data.

Then, each sensor 23 controls the connection state of each switch according to the control of the processor 22. With this control, the connection state is as illustrated in FIG. 8.

Then, from a time t21 to a time 23, processing same as the processing at the time t1 to the time t3 in FIG. 7 is performed. Accordingly, a period T21 including the time t21 to t23 is a period in which the sensor 23-1 transmits the transmission data as a transmission source.

Note that, in the period T21, in the sensor 23-2 that is not the transmission source and is adjacently connected on the opposite side of the processor 22 as viewed from the sensor 23-1 that is the transmission source, the driver 107-2 continuously outputs a state signal indicating that the transmission data is not transmitted in the period T21. In other words, the output of the state signal indicating that the transmission data is transmitted by the driver 107-2 is stopped.

The state signal transmitted from the driver 107-2 in this way is output to the connection wiring 27-3 via the switch 106-2, the resistor 105-2, and the pad 26-2 and is further transmitted to the reception unit 104-3 via the pad 25-3 and the resistor 101-3. By receiving the state signal transmitted from the driver 107-2 by the reception unit 104-3, that is, by detecting the state where the output of the state signal indicating that the transmission data is transmitted is stopped, the sensor 23-3 can recognize the transmission state of the transmission data in the adjacently connected sensor 23-2. In particular, in this example, the sensor 23-3 can recognize that the sensor 23-2 is not the transmission source.

In the period T21, when the transmission data is transmitted from the sensor 23-1 that is the transmission source to the processor 22, thereafter, the connection states of the switches in the sensor 23 are shifted to the connection states illustrated in FIG. 9, and the processing same as the processing at the time t4 to t6 in FIG. 7 is performed at times t24 to 26. A period T22 including the time t24 to t26 is a period in which the sensor 23-2 transmits the transmission data as a transmission source.

However, in the period T22, the driver 107-2 outputs the state signal, indicating that the transmission data is transmitted, at the time t24. The state signal is transmitted to the reception unit 104-3 via the switch 106-2, the resistor 105-2, the pad 26-2, the connection wiring 27-3, the pad 25-3, and the resistor 101-3 and is received by the reception unit 104-3.

With this transmission, the sensor 23-3 can recognize that the sensor 23-2 is transmitting the transmission data. Note that the state signal indicating that the transmission data is transmitted is continuously output by the driver 107-2 until the transmission of the transmission data by the sensor 23-2 is completed, that is, the time t26.

When the transmission of the transmission data by the sensor 23-2 has been completed, thereafter, the driver 107-2 outputs the state signal indicating that the transmission of the transmission data has been completed. In other words, the driver 107-2 stops the output of the state signal indicating that the transmission data is transmitted.

With this operation, the sensor 23-3 can recognize that the transmission of the transmission data by the sensor 23-2 has been completed.

When the transmission of the transmission data by the sensor 23-2 has been completed, that is, the period T22 ends, the sensors 23-1 to 23-3 change the connection states of the switches to be the connection state illustrated in FIG. 10. With this operation, the sensor 23-3 turns to be the sensor that is the transmission source, and the sensors 23-1 and 23-2 turn to be the sensors that are not the transmission source, and the sensor 23-3 starts to transmit the transmission data.

In other words, at a time t27, the driver 103-3 outputs a state signal indicating that the transmission of the transmission data is started. The state signal from the driver 103-3 is output to the connection wiring 27-3 via the switch 102-3, the resistor 101-3, and the pad 25-3.

The state signal output to the connection wiring 27-3 in this way is transmitted to the processor 22 via the sensor 23-2, the connection wiring 27-2, the sensor 23-1, and the connection wiring 27-1 and is received by the reception unit 51 of the processor 22. Furthermore, the state signal output to the connection wiring 27-3 is received by the reception unit 108-2 of the sensor 23-2 and the reception unit 108-1 of the sensor 23-1.

With this transmission, the processor 22 and the sensors 23-1 and 23-2 can recognize that the transmission data is transmitted by the sensor 23-3.

When the state signal is output from the driver 103-3 at the time t27, thereafter, the driver 61-3 outputs the transmission data at a time t28. The transmission data is output to the connection wiring 27-3 via the switch 63-3 and the pad 25-3.

The transmission data output to the connection wiring 27-3 in this way is transmitted to the processor 22 via the sensor 23-2, the connection wiring 27-2, the sensor 23-1, and the connection wiring 27-1 and is received by the reception unit 51 of the processor 22.

Then, when the transmission of the transmission data from the sensor 23-3 has been completed, the driver 103-3 outputs a state signal indicating that the transmission of the transmission data has been completed, at a time t29. The state signal from the driver 103-3 is output to the connection wiring 27-3 via the switch 102-3, the resistor 101-3, and the pad 25-3.

The state signal output to the connection wiring 27-3 in this way is transmitted to the processor 22 via the sensor 23-2, the connection wiring 27-2, the sensor 23-1, and the connection wiring 27-1 and is received by the reception unit 51 of the processor 22. Furthermore, the state signal output to the connection wiring 27-3 is received by the reception unit 108-2 of the sensor 23-2 and the reception unit 108-1 of the sensor 23-1.

By receiving such a state signal, the processor 22 and the sensors 23-1 and 23-2 can recognize that the transmission of the transmission data by the sensor 23-3 has been completed. A period T23 including the times t27 to t29 described above is a period in which the sensor 23-3 transmits the transmission data as a transmission source.

When the transmission of the transmission data by the sensor 23-3 has been terminated, the processing for transmitting the transmission data is terminated. Note that, in addition, in a case where the transmission data is transmitted/received between each sensor 23 and the processor 22, it is preferable to repeat the processing described with reference to FIG. 11.

As described above, in the electronic circuit 131, the sensors 23-1 to 23-3 sequentially transmit the transmission data to the processor 22. At this time, the state signals are exchanged between the sensors 23, and the sensor 23 can recognize a timing to start to transmit the transmission data by the state signal from the other sensor 23. Therefore, all the processor 22 need to do is to instruct the sensor 23 to start the transmission of the transmission data first. With this operation, the transmission data can be exchanged with more simple control.

<Exemplary Configuration of Imaging Device>

Moreover, the present technology can be applied to electronic devices, in which a master element and a plurality of slave elements are daisy-chain-connected, such as an imaging device including a digital still camera and a video camera, an electronic device using an imaging element for a photoelectric conversion unit such as a mobile terminal device having an imaging function, and the like.

Figure 12:
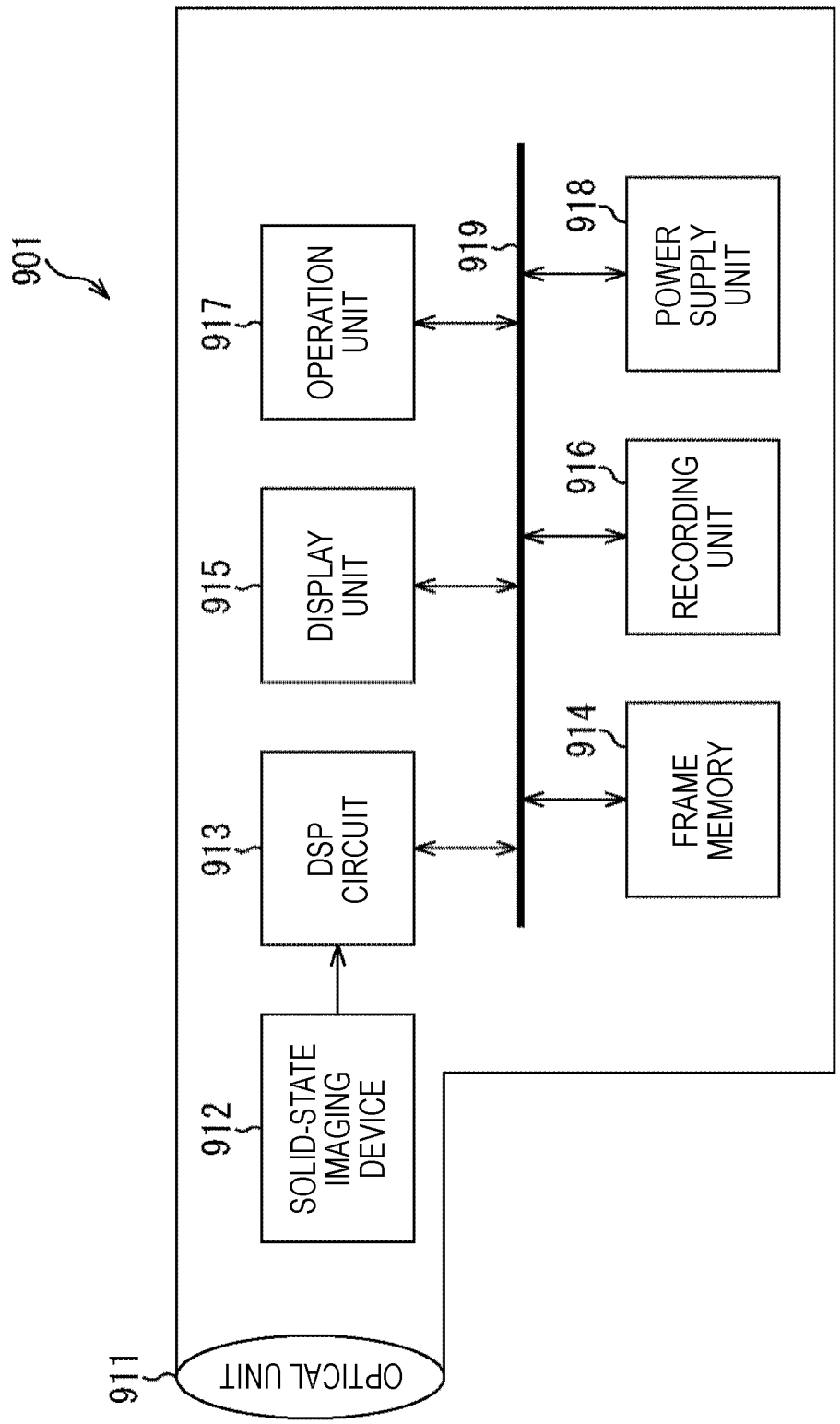
FIG. 12 is a diagram of an exemplary configuration of an imaging device to which the present technology is applied.

FIG. 12 is a diagram of an exemplary configuration of an imaging device as an electronic device to which the present technology is applied.

An imaging device 901 in FIG. 12 includes an optical unit 911 including a lens group and the like, a solid-state imaging device (image capturing device) 912, and a Digital Signal Processor (DSP) circuit 913 that is a camera signal processing circuit. Furthermore, the imaging device 901 includes a frame memory 914, a display unit 915, a recording unit 916, an operation unit 917, and a power supply unit 918. The DSP circuit 913, the frame memory 914, the display unit 915, the recording unit 916, the operation unit 917, and the power supply unit 918 are mutually connected via a bus line 919.

The optical unit 911 captures incident light (image light) from a subject and forms an image on an imaging surface of the solid-state imaging device 912. The solid-state imaging device 912 converts a light amount of the incident light imaged on the imaging surface by the optical unit 911 into an electric signal in pixel units and outputs the converted signal as a pixel signal. The solid-state imaging device 912 includes the electronic circuit 11 illustrated in FIG. 1, the electronic circuit 91 illustrated in FIG. 5, the electronic circuit 131 illustrated in FIG. 8, and the like. Furthermore, in this case, the DSP circuit 913 may function as the processor 22.

The display unit 915 includes, for example, a panel type display device such as a liquid crystal panel and an organic electro luminescence (EL) panel and displays a moving image or a still image imaged by the solid-state imaging device 912. The recording unit 916 records the moving image or the still image imaged by the solid-state imaging device 912 to a recording medium such as a video tape, a Digital Versatile Disk (DVD), and the like.

The operation unit 917 issues an instruction for operating various functions of the imaging device 901 under a user's operation. The power supply unit 918 appropriately supplies various power sources to be an operation power source of the DSP circuit 913, the frame memory 914, the display unit 915, the recording unit 916, and the operation unit 917 to the components which are supply targets.

Note that an embodiment of the present technology is not limited to the embodiments described above and can be variously changed without departing from the scope of the present technology.

Moreover, the present technology can be configured as follows.

(1) An electronic device including:
a master element and a plurality of slave elements that are daisy-chain-connected, in which
the slave element includes:
an input terminal that is connected to the slave element adjacently provided on the opposite side of the master element;
an output terminal that is connected to the slave element adjacently provided on the side of the master element or the master element; and
a first switch that is provided in a section between the input terminal and the output terminal used as a transmission path of transmission data and is connected to the transmission path in series,
the master element receives the transmission data transmitted from the slave element to be a transmission source via the transmission path, and
at least the slave element to be the transmission source includes a data transmission unit that is connected to the transmission path via a second switch and transmits the transmission data.

(2) The electronic device according to (1), in which
the slave element is an image sensor.

(3) The electronic device according to (1) or (2), in which
the slave element to be the transmission source transmits image data as the transmission data.

(4) The electronic device according to any one of (1) to (3), in which
in the slave element to be the transmission source, the first switch is released, and the second switch is connected, and
in the slave element connected between the slave element to be the transmission source and the master element, the first switch is connected.

(5) The electronic device according to (4), in which
in all the slave elements different from the slave element to be the transmission source, the first switches are connected.

(6) The electronic device according to (4), in which
each of the plurality of slave elements includes the data transmission unit and the second switch.

(7) The electronic device according to (6), in which
in all the slave elements different from the slave element to be the transmission source, the second switches are released.

(8) The electronic device according to (6), in which
the slave element to be the transmission source further includes:
a first state signal transmitting unit that is connected to the input terminal via a third switch and transmits a state signal indicating a transmission state of the transmission data; and a second state signal transmitting unit that is connected to the output terminal via a fourth switch and transmits the state signal, and each of the plurality of slave elements further includes:

a first state signal receiving unit that is connected to the input terminal and receives the state signal transmitted from the second state signal transmitting unit; and a second state signal receiving unit that is connected to the output terminal and receives the state signal transmitted from the first state signal transmitting unit.

(9) The electronic device according to (8), in which in the slave element to be the transmission source, each of the third switch and the fourth switch is connected.

(10) The electronic device according to (9), in which each of the plurality of slave elements includes the third switch, the first state signal transmitting unit, the fourth switch, and the second state signal transmitting unit, and in the slave element connected between the slave element to be the transmission source and the master element, the third switch and the fourth switch are released.

(11) The electronic device according to (10), in which in the slave element connected to the slave element to be the transmission source and provided on the opposite side of the master element, the first switch and the second switch are released.

(12) The electronic device according to (11), in which in the slave element connected to the slave element to be the transmission source and provided on the opposite side of the master element, the third switch is connected, and the fourth switch is released.

(13) The electronic device according to (12), in which in the slave element connected to the slave element to be the transmission source and provided on the opposite side of the master element, the first state signal transmitting unit transmits the state signal.

(14) The electronic device according to any one of (1) to (13), in which the master element and the plurality of slave elements are mounted on a substrate, and the input terminal and the output terminal are pads for connecting the substrate and the slave elements.

(15) A driving method of an electronic device including:

a master element and a plurality of slave elements daisy-chain-connected, in which the slave element includes:

an input terminal that is connected to the slave element adjacently provided on the opposite side of the master element;

an output terminal that is connected to the slave element adjacently provided on the side of the master element or the master element; and a first switch that is provided in a section between the input terminal and the output terminal used as a transmission path of transmission data and is connected to the transmission path in series, and at least the slave element to be the transmission source includes a data transmission unit that is connected to the transmission path via a second switch and transmits the transmission data, the driving method including steps of:

releasing the first switch and connecting the second switch in the slave element to be the transmission source;

connecting the first switch in the slave element connected between the slave element to be the transmission source and the master element;

transmitting the transmission data by the data transmission unit of the slave element to be the transmission source; and receiving the transmission data transmitted from the data transmission unit of the slave element to be the transmission source via the transmission path by the master element.

(16) A slave element that is daisy-chain-connected to a master element and one or a plurality of other slave elements, the slave element including:

an input terminal connected to the other slave element adjacently provided on the opposite side of the master element;

an output terminal connected to the other slave element adjacently provided on the side of the master element or the master element;

a first switch provided in a section between the input terminal to the output terminal used as a transmission path of transmission data and connected to the transmission path in series; and a data transmission unit that is connected to the transmission path via a second switch and transmits the transmission data to the master element.

REFERENCE SIGNS LIST

11 Electronic circuit
21 Substrate
22 Processor
23-1 to 23-3, 23 Sensor
27-1 to 27-3, 27 Connection wiring
61-1 to 61-3, 61 Driver
62-1 to 62-3, 62 Switch
63-1 to 63-3, 63 Switch
102-1 to 102-3, 102 Switch
103-1 to 103-3, 103 Driver
104-1 to 104-3, 104 Reception unit
106-1 to 106-3, 106 Switch
107-1 to 107-3, 107 Driver
108-1 to 108-3, 108 Reception unit

The invention claimed is:

1. An electronic device, comprising:
a master element; and
a plurality of slave elements that are daisy-chain-connected with the master element, wherein each of the plurality of slave elements includes:
an input terminal on a first portion of a side of each of the plurality of slave elements,
wherein the first portion is opposite to the master element;
an output terminal on a second portion of the side of each of the plurality of slave elements, wherein
the second portion is towards the master element, and
the input terminal is adjacent to the output terminal; and
a first switch in a section between the input terminal and the output terminal, wherein
the section is a transmission path of transmission data,
the first switch is connected to the transmission path in series,
the plurality of slave elements comprises a first slave element that is to be a transmission source,
the first slave element comprises a data transmission unit connected to the transmission path via a second switch, the data transmission unit is configured to transmit the transmission data, and
the master element is configured to receive the transmission data via the transmission path.

2. The electronic device according to claim 1, wherein the first slave element is an image sensor.

3. The electronic device according to claim 1, wherein the first slave element is configured to transmit image data as the transmission data.

4. The electronic device according to claim 1, wherein
the first switch is released and the second switch is connected in the first slave element, and
the first switch is connected in a second slave element of the plurality of slave elements connected between the first slave element and the master element.

5. The electronic device according to claim 4, wherein the first switch is connected in at least one slave element of the plurality of slave elements different from the first slave element.

6. The electronic device according to claim 4, wherein each of the plurality of slave elements further includes the data transmission unit and the second switch.

7. The electronic device according to claim 6, wherein the second switch is released in at least one slave element of the plurality of slave elements different from the first slave element.

8. The electronic device according to claim 6, wherein the first slave element further includes:
a first state signal transmitting unit connected to the input terminal via a third switch, wherein the first state signal transmitting unit is configured to transmit a state signal that indicates a transmission state of the transmission data; and
a second state signal transmitting unit connected to the output terminal via a fourth switch, wherein the second state signal transmitting unit is configured to transmit the state signal, and
each of the plurality of slave elements further includes:
a first state signal receiving unit connected to the input terminal, wherein the first state signal receiving unit is further configured to receive the state signal transmitted from the second state signal transmitting unit; and
a second state signal receiving unit connected to the output terminal, wherein the second state signal receiving unit is further configured to receive the state signal transmitted from the first state signal transmitting unit.

9. The electronic device according to claim 8, wherein the third switch and the fourth switch are connected in the first slave element.

10. The electronic device according to claim 9, wherein
each of the plurality of slave elements includes the third switch, the first state signal transmitting unit, the fourth switch, and the second state signal transmitting unit, and
the third switch and the fourth switch are released in the second slave element.

11. The electronic device according to claim 10, wherein
the first switch and the second switch are released in a third slave element of the plurality of slave elements connected to the first slave element, and
the third slave element is adjacent to the second slave element in a direction opposite to the master element.

12. The electronic device according to claim 11, wherein the third switch is connected and the fourth switch is released in the third slave element.

13. The electronic device according to claim 12, wherein in the third slave element, the first state signal transmitting unit is configured to transmit the state signal.

14. The electronic device according to claim 1, wherein
the master element and the plurality of slave elements are on a substrate, and
the input terminal and the output terminal are pads to connect the substrate and the plurality of slave elements.

15. A driving method, comprising:
in an electronic device including a master element and a plurality of slave elements daisy-chain-connected, wherein each of the plurality of slave elements includes:
an input terminal on a first portion of a side of each of the plurality of slave elements,
wherein the first portion is opposite to the master element;
an output terminal on a second portion of the side of each of the plurality of slave elements, wherein
the second portion is towards the master element; and
a first switch in a section between the input terminal and the output terminal wherein
the section is a transmission path of transmission data,
the first switch is connected to the transmission path in series, and
a first slave element of the plurality of slave elements to be a transmission source comprises a data transmission unit connected to the transmission path via a second switch of the first slave element;
releasing the first switch and connecting the second switch in the first slave element;
connecting the first switch in a second slave element of the plurality of slave elements connected between the first slave element and the master element;
transmitting the transmission data by the data transmission unit of the first slave element; and
receiving the transmission data via the transmission path by the master element.

16. A first slave element that is daisy-chain-connected to a master element and a plurality of slave elements, comprising:
an input terminal connected to a second slave element of the plurality of slave elements on a first portion of a side of the first slave element,
wherein the first portion is opposite to the master element;
an output terminal connected to the second slave element on a second portion of the side of the first slave element, wherein
the second portion is towards the master element, and
the input terminal is adjacent to the output terminal;
a first switch in a section between the input terminal and the output terminal wherein
the section is a transmission path of transmission data, and
the first switch is connected to the transmission path in series; and
a data transmission unit that is connected to the transmission path via a second switch, wherein the data transmission unit is configured to transmit the transmission data to the master element.

* * * * *